(12) United States Patent
Fournier et al.

(10) Patent No.: US 9,894,257 B2
(45) Date of Patent: Feb. 13, 2018

(54) LIGHT SOURCE MODULE WITH ADJUSTABLE DIFFUSION

(71) Applicant: Apple Inc., Cupertino, CA (US)

(72) Inventors: Florian R. Fournier, Cupertino, CA (US); Angelo M. Alaimo, San Francisco, CA (US); Simon S. Lee, San Jose, CA (US); Miodrag Scepanovic, San Jose, CA (US); Andreas G. Weber, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/711,707

(22) Filed: May 13, 2015

(65) Prior Publication Data

US 2016/0337564 A1    Nov. 17, 2016

(51) Int. Cl.
| | | |
|---|---|---|
| *H04N 5/225* | (2006.01) | |
| *G03B 15/05* | (2006.01) | |
| *H04N 5/235* | (2006.01) | |
| *F21V 14/00* | (2006.01) | |
| *F21V 14/06* | (2006.01) | |

(Continued)

(52) U.S. Cl.
CPC ......... *H04N 5/2256* (2013.01); *F21V 14/003* (2013.01); *F21V 14/06* (2013.01); *F21V 23/0478* (2013.01); *G03B 15/05* (2013.01); *G06K 9/4652* (2013.01); *G06K 9/4661* (2013.01); *H04N 5/2252* (2013.01); *H04N 5/2354* (2013.01); *G03B 2215/0567* (2013.01);

(Continued)

(58) Field of Classification Search
None
See application file for complete search history.

(56) References Cited

U.S. PATENT DOCUMENTS

| | | | |
|---|---|---|---|
| 4,323,952 A | 4/1982 | Proske | |
| 5,485,201 A * | 1/1996 | Aoki | G03B 7/16 348/223.1 |

(Continued)

OTHER PUBLICATIONS

"Electronically Variable Optical Diffuser", Downloaded from http:// www.edmundoptics.com/techsupport/resource_center/product_docs/manl_87316.pdf, pp. 1-3.

(Continued)

*Primary Examiner* — Roberto Velez
*Assistant Examiner* — Quan Pham
(74) *Attorney, Agent, or Firm* — Robert C. Kowert; Meyertons, Hood, Kivlin, Kowert & Goetzel, P.C.

(57) ABSTRACT

A light source module includes an array of illumination elements and a light diffusing material. The light source module is configured to receive a control signal for adjusting diffusion of light emitted from the light source module and in response adjust the amount of diffusion of light emitted from the light source module. A light source module may include a segmented light diffusing material where each segment is associated with an illumination element. And individual segments may have light diffusing properties that are different than other segments of the light diffusing material. Some illumination elements may emit light of a different color spectrum than other illumination elements, and a light diffusing material may scatter the different colored light to illuminate a scene with combinations of light of different colors. A light source module may be embedded in a mobile computing device.

17 Claims, 16 Drawing Sheets

(51) Int. Cl.
*F21V 23/04* (2006.01)
*G06K 9/46* (2006.01)

(52) U.S. Cl.
CPC ............... *G03B 2215/0571* (2013.01); *G03B 2215/0596* (2013.01)

(56) References Cited

U.S. PATENT DOCUMENTS

| | | | |
|---|---|---|---|
| 6,379,022 B1 | 4/2002 | Amerson et al. | |
| 8,761,594 B1 | 6/2014 | Gross et al. | |
| 2007/0153495 A1* | 7/2007 | Wang | G03B 15/05 362/84 |
| 2010/0188018 A1* | 7/2010 | Salm | F21V 7/00 315/294 |
| 2010/0254692 A1 | 10/2010 | Kurt et al. | |
| 2011/0103057 A1* | 5/2011 | Chen | F21V 5/00 362/240 |
| 2011/0170296 A1* | 7/2011 | Heise | F21V 14/003 362/294 |
| 2011/0176029 A1* | 7/2011 | Boydston | H04N 1/46 348/223.1 |
| 2012/0154627 A1* | 6/2012 | Rivard | G03B 15/02 348/224.1 |
| 2013/0141013 A1* | 6/2013 | Kodama | F21K 9/64 315/294 |
| 2013/0195435 A1* | 8/2013 | Yost | H04N 5/222 396/164 |
| 2013/0215611 A1* | 8/2013 | Wong | F21V 7/0083 362/243 |
| 2013/0222865 A1* | 8/2013 | Iwamatsu | G02B 6/0051 358/484 |
| 2014/0063049 A1 | 3/2014 | Armstrong-Muntner | |
| 2015/0009398 A1* | 1/2015 | Shih | H04N 5/2354 348/370 |
| 2015/0264779 A1* | 9/2015 | Olsen | F21S 8/026 315/294 |

OTHER PUBLICATIONS

G. Michael Morris, et al., "Engineered diffusers for display and illumination systems: Design, fabrication, and applications", Downloaded from http://www.physics.uci.edu/~isis/Yountville/Sales.pdf, pp. 1-11.
International Search Report and Written Opinion from PCT/US2016/032455, dated Sep. 7, 2016, Apple Inc., pp. 1-10.

* cited by examiner

LIGHT SOURCE MODULE WITH ADJUSTABLE DIFFUSION

BACKGROUND

Technical Field

This disclosure relates generally to light source modules which can emit a diffused beam of light, including, without limitation, flash modules used to illuminate subjects in images captured by a camera device.

Description of the Related Art

For small devices, including devices which include one or more miniature cameras, it is common to include a flash, also referred to herein as a light source module, which illuminates at least a portion of a scene located within a field of view of the camera. The field of view of a camera may be referred to herein as a "scene". Such cameras and light source modules can be included in a larger electronic device, including a mobile electronic device, which can include a mobile telephone, smartphone, notebook, etc.

The light source module, which can include a "flash" module, "strobe" module, etc., can emit light which illuminates a space external to the lighting module and can include the camera field of view, thereby illuminating subjects within the camera field of view for images of said subjects captured by the camera.

In some cases, the lighting module included in a small device includes a light source which includes an illumination element, such as a light emitting diode (LED) or laser diode. And, a diffuser may be placed adjacent to the LED so that light emitted from the LED passes through the diffuser as the light leaves the light source. The diffuser may cause the light emitted from the LED to be spread out or scattered as a result of the light passing through the diffuser as it exits the light source.

In some cases, a camera field of view or scene may include multiple subjects under different ambient lighting conditions. A lighting module may include a diffuser that diffuses light such that the diffused light does not reach the multiple subjects in the scene, resulting in inadequate lighting of at least some of the subjects in the scene. Or, a lighting module may include a diffuser that directs light such that light directed at a closer subject of the multiple subjects of the scene results in harsh light and hard shadows on the closer subject. Harsh light and hard shadows may result in less desirable images than images captured of a scene that is illuminated with diffuse light.

SUMMARY OF EMBODIMENTS

Some embodiments provide a mobile computing device which includes a camera and a light source module embedded in the mobile computing device. The light source module can include an illumination array including multiple illumination elements configured to emit light. For example, an illumination array may include an array of light emitting diodes (LEDs). The light source module can also include a light diffusing material that is positioned relative to the illumination array by a housing such that light emitted from one or more of the illumination elements passes through the light diffusing material when emitted from the light source module. In some embodiments, the housing may be a reflector or one or more lenses. In some embodiments, the housing may include a reflector and one or more lenses. In some embodiments, the housing may be additional structure that holds the light diffusing material in place. The mobile computing device can include a controller that can detect characteristics of a field of view of the camera based on information received from the camera and can adjust a level of diffusion of light emitted from the light source module based on the detected characteristics of the field of view of the camera. For example, the light diffusing material positioned in the housing can include multiple segments where each segment has a light diffusing property that is different than a light diffusing property of at least one of the other segments of the light diffusing material. The controller can adjust the diffusion of light emitted from the light source module by selectively illuminating one or more of the illumination elements of the illumination array, where individual illumination elements of the illumination array are associated with particular segments of the light diffusing material. In another example, a light diffusing material positioned in the housing adjusts a light diffusing property based on application of an electric current or voltage to the light diffusing material. And, the controller can cause the current or voltage applied to the light diffusing material to be adjusted to adjust the diffusion of light emitted from the light source module.

Some embodiments provide a light source module that includes multiple illumination elements and a light diffusing material that can diffuse light emitted from one or more of the illumination elements. For example, the illumination elements may be LEDs and the light diffusing material may be positioned adjacent to the LEDs such that light emitted from the LEDs passes through the light diffusing material when exiting the light source module. The light source module may be configured to be embedded in a mobile computing device. And, may be configured to receive one or more control signals for adjusting an amount of diffusion for light emitted from the light source module and adjust the amount of diffusion of the light emitted from the light source module based on receiving the one or more control signals.

Some embodiments provide a method, which can be performed by one or more computer systems, which includes receiving an input describing one or more characteristics of a scene. And determining, based on the received input of the characteristics of the scene, diffusivity adjustments for light emitted from one or more illumination elements of multiple illumination elements of a light source module embedded in a mobile computing device. The method includes sending one or more control signals to the light source module to illuminate the scene in accordance with the determined diffusivity adjustments.

Figure 1A:
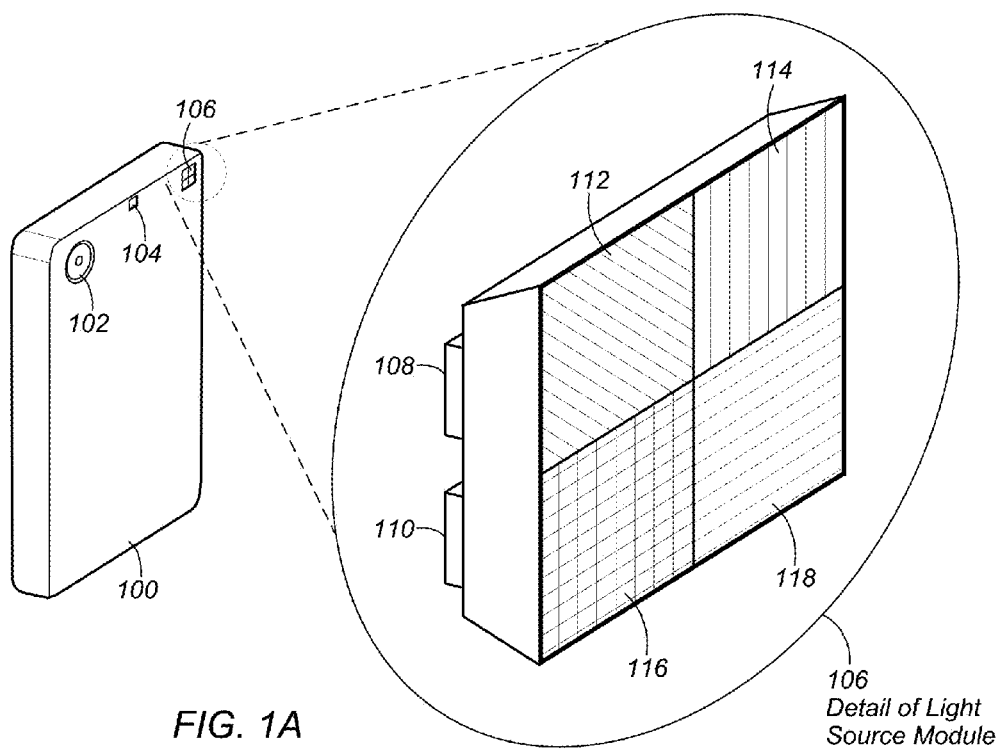
FIG. 1A-B illustrate a mobile computing device which includes an embedded light source module, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

DETAILED DESCRIPTION

Introduction

Some embodiments provide a light source module with a plurality of illumination elements that can be individually controlled to adjust a level of diffusion of light emitted from the light source module. In some embodiments, a light diffusing material associated with a particular illumination element may be a segment of a light diffusing material. A light source module may include a light diffusing material with multiple segments with different light diffusing properties. Separate illumination elements of the light source module may be associated with at least one segment of the light diffusing material that has a particular light diffusing property. In some embodiments, an electrically controllable light diffusing material may be associated with an illumination element. The diffusion of light emitted from a light source module may be adjusted by illuminating illumination elements associated with segments of the light diffusing material that have particular light diffusing properties. In some embodiments, the diffusion of light emitted from a light source module may be adjusted by adjusting a level of diffusion of an electrically controllable light diffusing material. In some embodiments, a light source module may include a segmented light diffusing material, an electrically controllable light diffusing material, or a combination of both. And, the diffusion of light emitted from the light source module may be controlled by illuminating particular illumination elements associated with segments of a light diffusing material with different light diffusing properties, by adjusting the electrically controllable light diffusing material, or a combination of both. As discussed in more detail below, various combinations of illumination elements, light diffusing materials, and other components may be configured to adjustably control a level of diffusion of light emitted from an array of illumination elements of a light source module.

Some embodiments provide a device which includes a camera module, which can capture images of scenes located within the camera field of view, and a light source module which is adjustably controllable to provide adjustable illumination of one or more regions of the camera field of view. Such adjustable illumination can include selective diffusion of light directed at one or more regions, limited regions, subjects, etc. of a camera field of view.

In some embodiments, a light diffusing material of a light source module may, in addition to diffusing light emitted from the light source module, obscure a view of internal components of the light source module. The light diffusing material that obscures the internal components of the light source module may give the light source module a more sleek appearance that blends the light source module into the appearance of a mobile computing device in which the light source module is embedded. In some embodiments, a light source module may include an electrically controllable light diffusing material that ranges from opaque to translucent. And, may be controlled to be in an opaque state when the light source module is not in use to obscure or hide a view of internal components of a light source module and to give a mobile device in which the light source module is embedded a more sleek appearance.

Segmented Light Source Module

In some embodiments, a light source module may be embedded in a mobile device and may provide light to illuminate a scene to be captured by a camera or video recorder of a mobile device. For example, FIG. 1A illustrates a mobile device 100 with a camera 102, sensor 104, and embedded light source module 106. In some embodiments, sensor 104 may be a light sensor that can detect ambient lighting conditions. In some embodiments, sensor 104 may also detect subjects in a scene and distances from the mobile device to detected subjects. A controller may use information from a camera, such as camera 102, a sensor, such as sensor 104, and user inputs to a mobile device, such as mobile device 100, to determine levels of adjustment for the diffusion of light emitted from a light source module, such as light source module 106.

A controller may instruct separate illumination elements associated with segments of a light source module to illuminate to adjust the diffusion of light emitted from the light source module, wherein particular segments of a light source module include light diffusing materials that have different levels of diffusion than other segments of the light source module. For example, FIG. 1A illustrates a detail of light source module 106. In the detail view, light source module 106 includes segments 112, 114, 116, and 118. Also illumination elements 108 and 110 are illustrated. A light source module may comprise particular illumination elements that are each associated with a particular segment of a segmented light diffusing material. For example, segment 116 may have a light diffusing property that diffuses light more than a light diffusing property of segment 112. And, segment 116 may be associated with illumination element 110, and segment 112 may be associated with illumination element 108. Because different segments of a light diffusing material of a light source module have different diffusing properties and are associated with separate illumination elements, a controller may instruct particular illumination elements associated with particular segments with different light diffusing properties to tailor the diffusion of light from a light source module to particular lighting conditions of a scene. For example, a scene may be best illuminated by light that is more diffuse in the bottom half of the scene than light in the top half of the scene. In this example, segments 116 and 114 may have greater diffusivity properties than segments 112 and 118. A controller in a mobile computing device, such as mobile computing device 100, may determine to illuminate a segment, such as segment 116, to provide more diffuse light to the bottom portion of the scene and illuminate, another segment, such as segment 112, to provide more concentrated light in the top half of the scene. In some embodiments, different combinations of segments with different light diffusing properties may be used. In some embodiments, a single light diffusing material may be used that adjusts its diffusion properties based on the application of a current or voltage.

In some embodiments, separate segments of a light source module may be associated with illumination elements that emit different color spectra of light. For example, segment 112 may be associated with an illumination element that emits blue light, and segment 114 may be associated with an illumination element that emits red light. In FIG. 1 light source module 106 is illustrated with four segments, however in some embodiments a light source module may include more or less segments. And illumination elements may include illumination elements that emit light of any variety of colors. In some embodiments, illumination elements may be adjustable to emit light of different intensities based on a received control signal.

Multiple segments of a light source module may be illuminated concurrently to illuminate a scene with light that is a combination of the light emitted from the concurrently illuminated segments. The mixed light may combine different diffusivity properties of the concurrently illuminated segments, or may combine lights of different color spectra from different illumination elements, among other combinations. For example, in FIG. 1B light source module 106 emits light with four different diffusion properties, for example light 120, 122, 124, and 126. The different diffusion properties of the light emitted from a light source module may combine to illuminate portions of a scene with light that is a combination of light with different diffusion properties. For example, the top portion of a scene, such as portion 128 of scene 132, may be a mix of light 120 and light 122 that have different light diffusion properties. Also, the bottom portion of a scene, such as portion 130 of scene 132, may be a mix of light 124 and 126 that have different diffusion properties. A light source module may be able to provide light with a wide range of diffusion properties by mixing light from separate segments of the light source module that each have separate diffusion properties.

In some embodiments, a light source module may include multiple illumination elements and one or more of the illumination elements may emit light of a different color spectrum than other illumination elements of the light source module. A diffusing material may diffuse light emitted from different illumination elements at different color spectra to illuminate a scene with light that mixes the different color spectra into a composite color to illuminate the scene. For example, a scene may be of the inside of a dark room and include a picture on a wall that is drawn with bright colors. It may be desirable to decrease the correlated color temperature of the scene in the dark room by illuminating the scene with red light, while the portion of the scene that includes the brightly painted picture may benefit from light with higher correlated color temperature, such as blue light. A light source module, such as light source module 106, may include an illumination element associated with light 124 that emits blue light, and an illumination element associated with light 122 that emits red light. A controller in a mobile device, such as mobile device 100, may determine a desired combination of colors of light to illuminate a scene and may send one or more control signals instructing a light source module, such as light source module 106, to illuminate the scene according to the desired combination of colors. A light source module, such as light source module 106, may illuminate the scene with red light, such as light 122 and blue light, such as light 124. A diffusing material placed in front of illumination elements of a light source module, such as segments 112, 114, 116, and 118 described in FIG. 1A may diffuse the blue light and the red light so that the two color spectra of light have a smooth transition from red to blue.

Also, segments of a light diffusing material of a light source module may be used to create different colors of light. For example, a light source module may include an illumination element that emits red light and an illumination element that emits blue light. A particular scene may be best illuminated with a combination of red light and blue light (for simplicity the red and blue light are described as mixing to form magenta light, but may also combine to form a neutral white light). A light source module may include an illumination element that emits red light that is associated with a segment of a light diffusing material that has a high light diffusing property. The light source module may also include an illumination element that emits blue light and is associated with a segment of a light diffusing material that has a high light diffusing property. The light source module may emit magenta light by concurrently illuminating the red and blue illumination elements that are both associated with segments of a light diffusing material with high light diffusing properties. Since the segments with the high light diffusing properties will scatter light over the scene, the red and blue lights emitted from the red and blue illumination elements will combine in the scene to illuminate the scene with a magenta (i.e. red and blue) light.

In some embodiments, segments of a light diffusing material may have varying light diffusion properties and may be associated with illumination elements that emit light of different color spectra. For example, a light source module may emit more concentrated light of a particular color from one segment of the light source module and blend light of other colors from other segments of a light source module. Continuing the example above, in addition to illuminating the scene with magenta light, a light source module may further receive one or more control signals instructing the light source module to illuminate a portion of a scene with yellow light. The light source module may illuminate blue and red illumination elements associated with segments with high light diffusing properties as described above. And, may also illuminate an illumination element that emits yellow light and that is associated with a segment of a light diffusing material that has a low light diffusing property such that the illumination element and associated segment emit concentrated yellow light. A portion of the scene may be illuminated by the light source module with diffuse magenta light and another portion of the scene may be illuminated with concentrated yellow light by illuminating the different illumination elements that emit light of different color spectra and are associated with different segments of a light diffusing material that have different light diffusing properties. The above examples, are only to illustrate some possible combinations, as one skilled in the art will understand, many other combinations may be used. In some embodiments, other color spectra of light may be used. Also in some embodiments, different levels of light diffusing properties of segments of a light diffusing material may be combined with different combinations of illumination elements of different colors.

In some embodiments a light diffusing material may be a surface diffuser that has a surface finish that causes light to diffuse as the light passes through the light diffusing material. In some embodiments, a light diffusing material may be a volume diffuser that includes impurities (e.g. non-homogenous particles) impregnated in the material that cause light to diffuse as the light passes through the material. In some embodiments, different segments of a light diffusing material may include different types of diffusers, such as surface diffusers, volume diffusers, or a combination of both. In some embodiments, a light diffusing material may be electrically controllable and may include a polymer liquid crystal device or electrochromic glass. In some embodiments, other types of diffusers and controllable diffusers may be used.

Figure 1B:
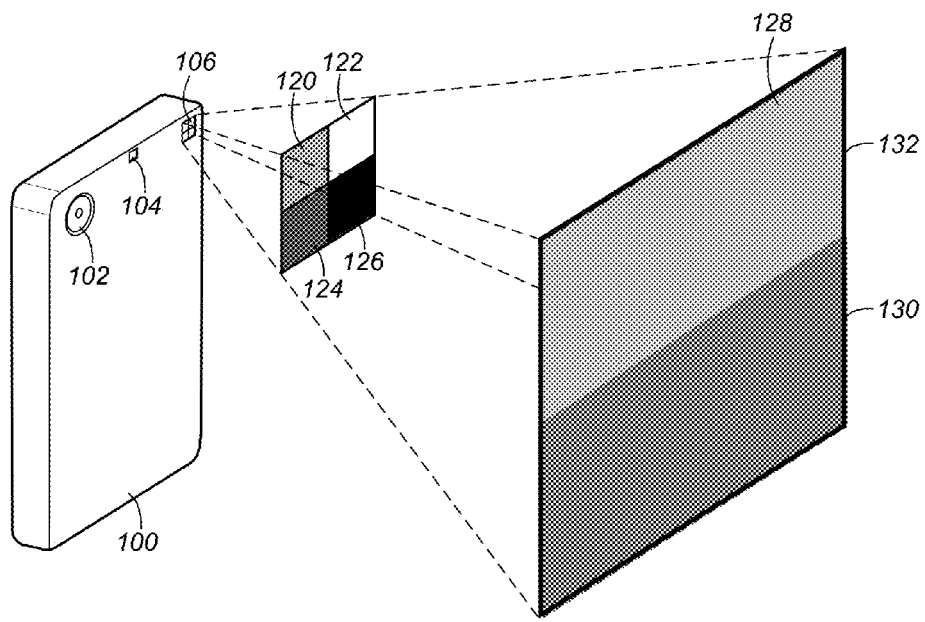
Figure 2:
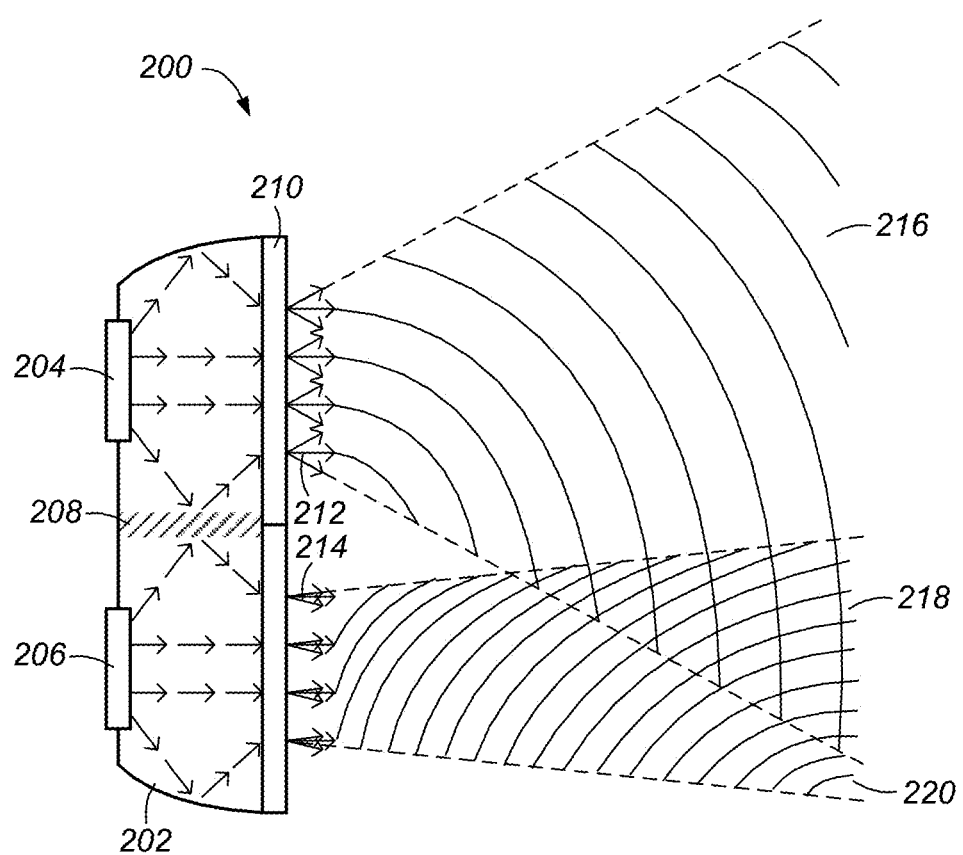
FIG. 2 illustrates a light source module with a light diffusing material with multiple segments, according to some embodiments.

FIG. 2 illustrates an example of a light source module, such as light source module 106 in FIGS. 1A-B, according to some embodiments. FIG. 2 shows how light is emitted from an illumination element, is directed to a segment of a light diffusing material with a particular light diffusing property, and is mixed with light emitted from a different illumination element associated with a different segment of a light diffusing material with a different particular light diffusing property. For example, light source module 200 in FIG. 2 includes illumination elements 204 and 206 that are associated with different segments of light diffusing material 210. A reflective partition, such as partition 208, may separate segments of a light diffusing module such that light emitted from an illumination element associated with a segment of a light diffusing material is separated from light emitted from another illumination element associated with another segment of a light diffusing material. For example, illumination element 204 emits light that is directed at a segment of light diffusing material 210. A portion of the light emitted from illumination element 204 bounces off partition 208 and is directed at light diffusing material 210. A portion of the light emitted from illumination element 204 also bounces off a reflective housing or reflector of light source module 200 to be directed at light diffusing material 210. In a similar manner, light emitted from illumination element 206 is directed at a bottom segment of light diffusing material 210. A light diffusing material, such as light diffusing material 210, may include different segments that emit light that is more diffuse than light emitted from other segments of the light diffusing material. For example, light 212 emitted from the top portion of light diffusing material 210 may be more diffuse (indicated by arrows that are more spread out), than light emitted from the bottom portion of light diffusing material 210. For example, light 214 may be more concentrated than light 212 (indicated by arrows that are more narrowly focused).

Light emitted from a light source module with different diffusion properties may be used to illuminate different portions of a scene with light having different properties. For example, diffuse light 212 may be used to illuminate a top portion of a scene, such as portion 216. Concentrated light, such as light 214 may be used to illuminate a bottom portion of a scene such as portion 220. And, a combination of diffuse light and concentrated light, such as diffuse light 212 and concentrated light 214, may be used to illuminate a portion of a scene such as portion 218.

In some embodiments, a light source module, such as light source module 200, may include illumination elements with adjustable intensities. For example, illumination elements 204 and 206 may be LEDs that emit more or less intense light depending on an amount of current or voltage that is applied to illuminate the LEDs. A light source module with adjustable intensity illumination elements may adjust the intensity of illumination elements associated with different segments of a light diffusing material with different light diffusing properties to provide light with a range of properties based on one or more received control signals.

Figure 3:
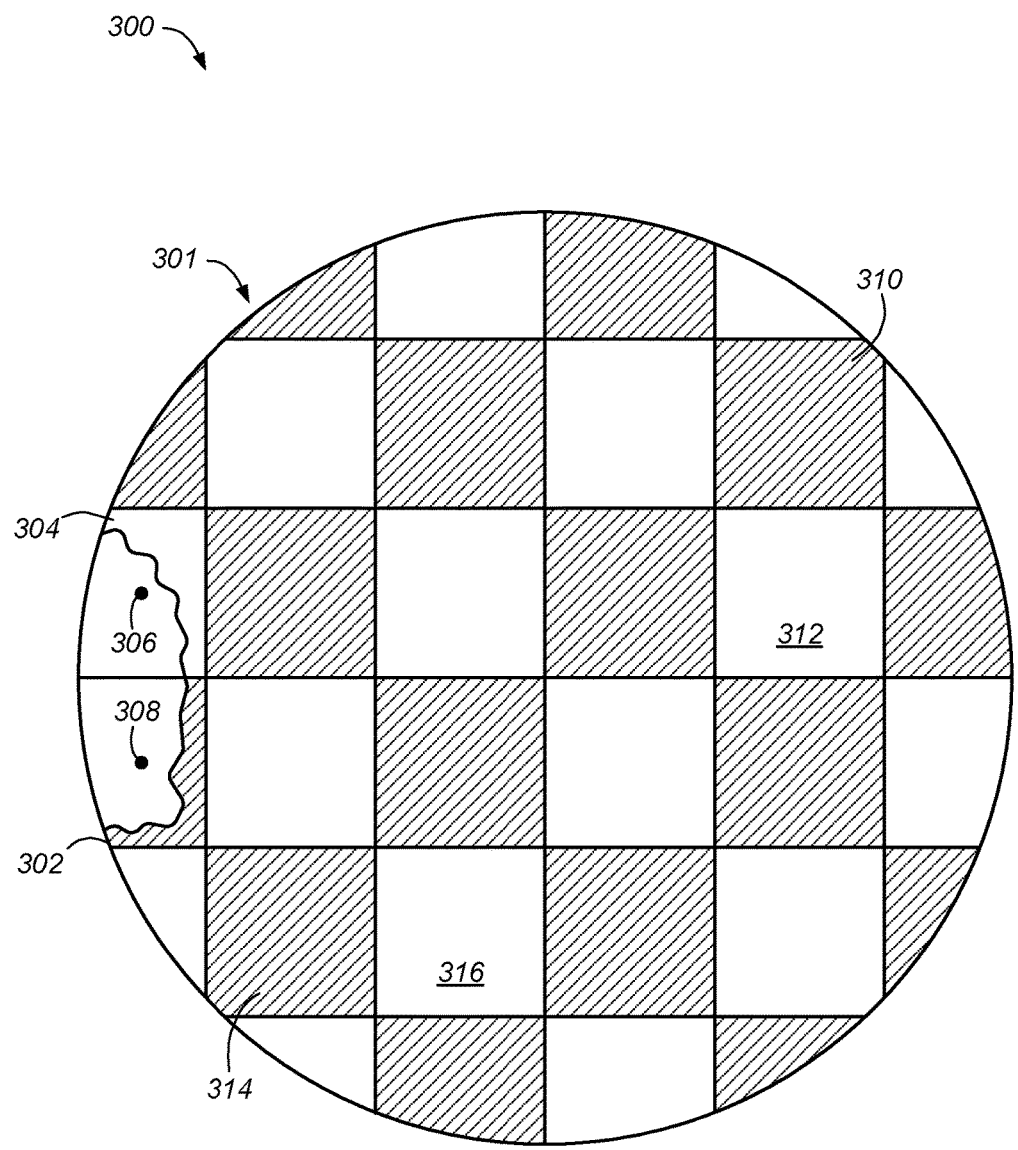
FIG. 3 illustrates a light source module with a segmented light diffusing material that includes multiple segments, according to some embodiments.
Figure 4A:
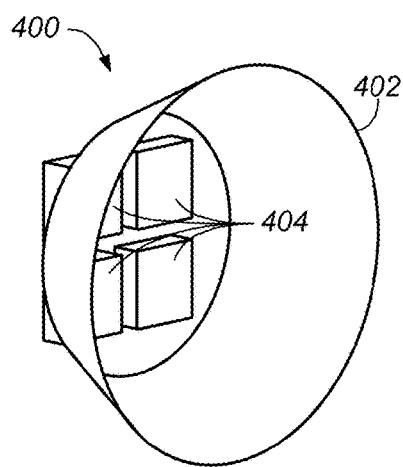
FIG. 4A-D illustrate light source modules with different reflector shapes, according to some embodiments.
Figure 4B:
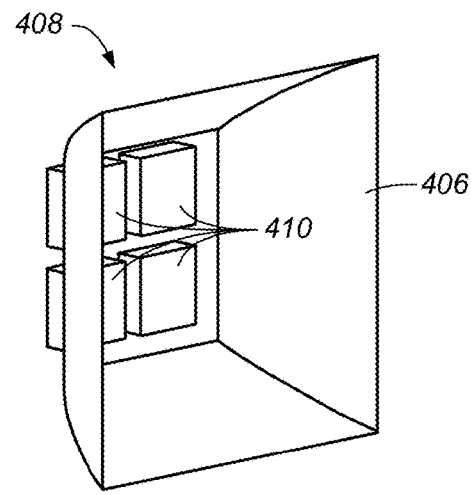
Figure 4C:
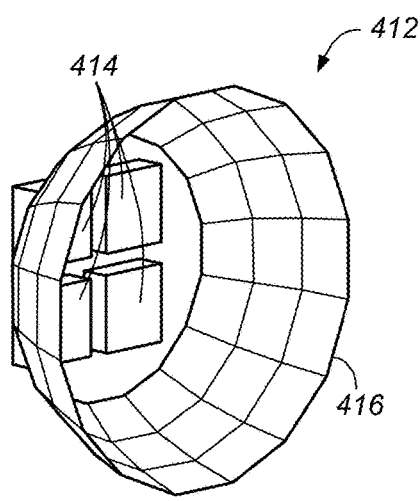
Figure 4D:
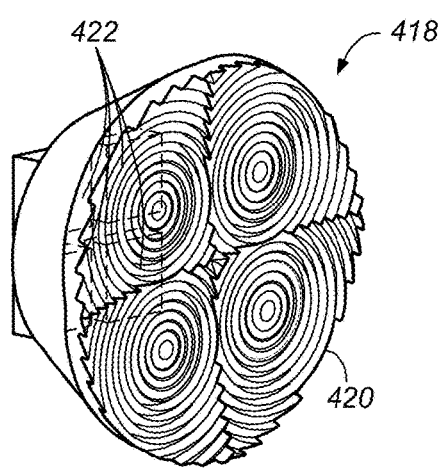

FIG. 3 illustrates a light source module with a segmented light diffusing material, according to some embodiments. A light source module may include an array of illumination elements that are each associated with a segment of a light diffusing material such that light emitted from an illumination element associated with a particular segment of the light diffusing material passes through the particular segment of the light diffusing material and is diffused in accordance with the light diffusing properties of the particular segment of the light diffusing material. Segments of a light diffusing material may be arranged in various combinations. In FIG. 3, light diffusing material 301 includes segments that are arranged in a checkerboard arrangement. For example, segments 302, 310, and 314 may have a common light diffusing property. And, segments 304, 312, and 316 may have a common light diffusing property that is different than the light diffusing property of segments 302, 310, and 314. Each segment may be associated with a separate illumination element. For example, illumination element 306 is associated with segment 304 and illumination element 308 is associated with segment 302. In some embodiments an illumination element may be associated with more than one segment, and a segment may be associated with more than one illumination element. Light source module 300 illustrated in FIG. 3 may be any of light source modules 106, or 200 described above in regards to FIGS. 1, and 2, respectively.

An arrangement of segments that includes multiple segments with similar light diffusing properties, such as the checkerboard arrangement of light source module 300, may permit combinations of diffuse and concentrated light to be directed at different portions of a scene illuminated by a light source module. For example, a controller may determine to illuminate a scene with diffuse light in a bottom portion of a scene and a top quadrant of a scene. The controller may determine to illuminate the other top quadrant of the scene with concentrated light. A light source module, such as light source module 300, may illuminate illumination elements associated with segments with a higher diffusing property in portions of the light source module that correspond with segments in the bottom and first top quadrant of the light source module. A light source module, such as light source module 300, may also illuminate illumination elements associated with segments that have a lower diffusing property in the second top quadrant of the light source module. In this way, the light source module may illuminate the bottom portion and first top quadrant of a scene with diffuse light and illuminate the second top quadrant with concentrated light.

As will be understood by those skilled in the art, various combinations of segments with various light diffusing properties may be arranged in multiple arrangements to selectively control the light diffusing properties of different portions of a scene illuminated by an array of illumination elements of a light source module.

Example Shapes of Light Source Modules

FIGS. 4A-D illustrate light source modules with different reflector and lens shapes, according to some embodiments. Light source modules may include a reflector with a reflective surface or a lens with refractive surfaces that directs light emitted from an illumination element of the light source module towards a light diffusing material and ultimately out of the light source module and into a scene that is to be illuminated by the light source module. Light source modules may include reflectors or lenses with different shapes, where the different shapes of reflectors or lenses are tailored to create a beam of light that fills a region of interest in a scene. The reflector or lens of a light source module redirects light towards the region of interest. A light source module may include a circular shaped reflector, such as reflector 402 of light source module 400 in FIG. 4A, a square shaped reflector, such as reflector 406 of light source module 408 in FIG. 4B, a polygonal shaped reflector, such as reflector 416 of light source module 412 in FIG. 4C, or a Fresnel lens, such as lens 420 of light source module 418 in FIG. 4D. In some embodiments, other reflector or lens shapes may be used. Any of the light source modules described above may include reflectors or lenses such as the reflectors and lenses described in FIGS. 4A-D.

In some embodiments, a light source module may include multiple illumination elements within a single reflector, such as illumination elements 404 in reflector 402, illumination elements 410 in reflector 406, illumination elements 414 in reflector 416, and illumination elements 422 in reflector 420. In some embodiments, a reflector may include a single illumination element. In some embodiments different types of lenses, such as Fresnel lens 420, may be combined with reflectors of different shapes, such as circular shaped reflector 402, square shaped reflector 406, polygonal shaped reflector 412, or reflectors having other shapes.

In some embodiments, multiple illumination elements in a single reflector may include illumination elements that emit light of different color spectra. For example, a light source module, such as light source module 402 may include illumination elements of different colors, such as red, green, blue, etc. A light diffusing material attached to a light source module, such as light source module 400 may diffuse light emitted from the different illumination elements that emit light of different color spectra so that a homogenous colored light is emitted from the light source module and illuminates a scene with light that is a mix of the different color spectra. As discussed below in regard to FIG. 6, in some embodiments a reflector may include one or more reflective partitions that separate light emitted from illumination elements of a light source module.

Figure 5:
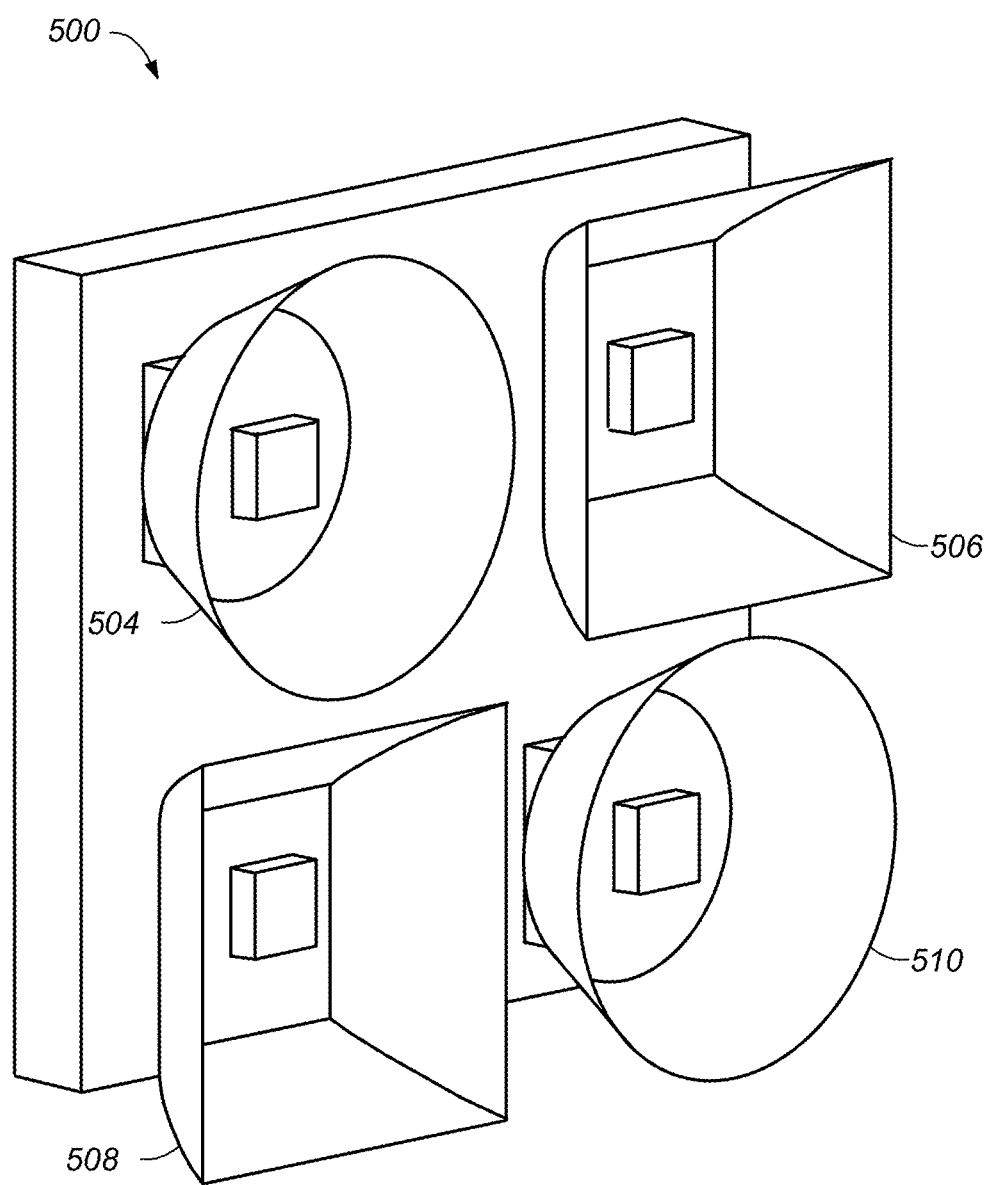
FIG. 5 illustrates a light source module that includes multiple reflector shapes, according to some embodiments.

FIG. 5 illustrates a light source module that includes multiple reflectors with different shapes, according to some embodiments. Different shapes of reflectors may have different light reflecting characteristics, so that some shapes may generate a narrower beam of light compared to other shapes that may generate a wider beam of light. A light source module may include multiple reflector shapes to allow the light source module to illuminate a scene with varying degrees of narrow beams of light and wide beams of light. For example, a scene may be best illuminated with a wide beam of white light and a narrow beam of red light directed at the face of a subject in the scene. By using different combinations of reflector shapes along with combinations of illumination elements of different colors and with light diffusing materials with segments that have different light diffusing properties, lighting may be tailored to the specific needs of a scene to be captured. For example, light source module 500 includes circular shaped reflectors 504 and 510 and includes square reflectors 506 and 508. Continuing the above example, light source module 500 may include a white light illumination element in reflectors 506 and 508 and a red light illumination element in circular reflectors 504 and 510. Light source module 500 may illuminate the illumination elements associated with reflectors 506 and 508 to broadly illuminate a scene with white light and may illuminate the illumination element associated with reflector 504 to direct a concentrated beam of red light towards a particular portion of the scene, such as the face of a subject located in the scene.

Light source module 500 is an example of a light source module that includes reflectors with multiple shapes. In other embodiments a light source module may include more or less reflectors, reflectors with different shapes, different combinations of shapes, etc.

In some embodiments, a light source module, such as light source module 500 may include illumination elements associated with different lens types. In some embodiments, a light source module, such as light source module 500 may include illumination elements with similar reflector shapes but varying lens types. The different lens types included in a light source module, such as light source module 500, may allow the light source module to illuminate a scene with varying degrees of narrow beams of light and wide beams of light. Any of the light source modules described above in regard to FIGS. 1-4 may include multiple reflectors and lens types such as light source module 500.

Figure 6:
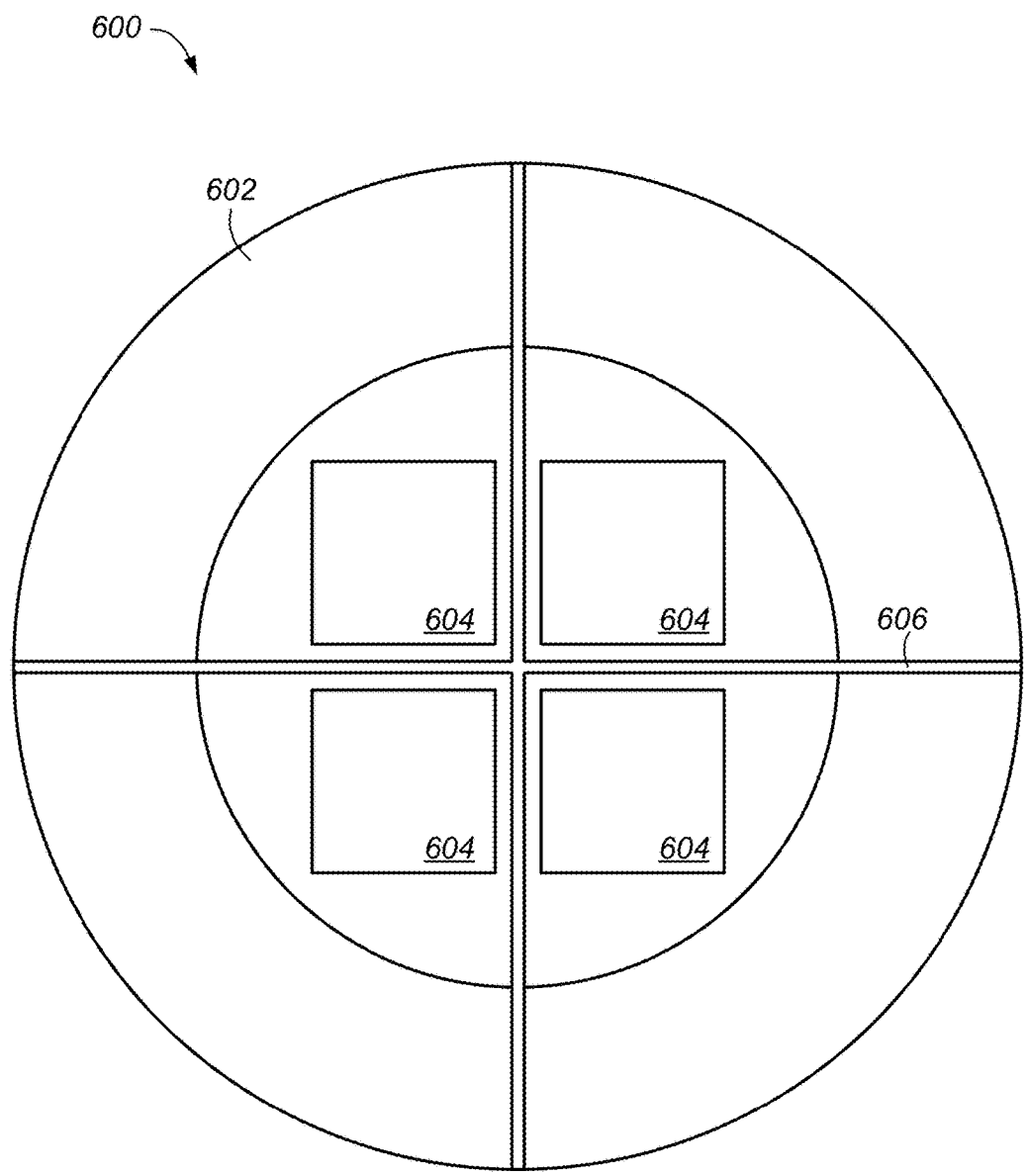
FIG. 6 illustrates a light source module that includes partitions between illumination elements, according to some embodiments.

FIG. 6 illustrates a light source module with multiple illumination elements separated by partitions, according to some embodiments. In some embodiments, a light source module may include a reflector with multiple illumination elements separated by one or more partitions. For example, light source module 600 includes a circular reflector, reflector 602, and illumination elements 604 that are separated by partitions 606. A partition may allow different segments of a segmented light diffusing material to be separately illuminated by separate illumination elements in a single reflector without mixing the light emitted from the different segments while the light is in the light source module. In some embodiments, a partition may allow illumination elements that emit different color spectra of light to be separated in a single reflector. In some embodiments, a reflector with partitioned illumination elements may be included in a light source module that comprises multiple reflectors, such as light source module 500 in FIG. 5. In some embodiments, other combinations of shapes, illumination elements, and segmented light diffusing materials may be combined. Any of the light source modules described above in regard to FIGS. 1-5 may include partitions such as light source module 600.

Electrically Controlled Light Diffusing Materials

An electrically controlled light diffusing material can be used to adjust an amount of diffusion based on an amount of current or voltage applied to the electrically controlled light diffusing material. In some embodiments, one or more types of "smart glass" may be used. The term "smart glass" may in general refer to electrically switchable glass or similar material whose optical properties may be changed when an electrical signal such as a changed voltage is applied. Some types of smart glass may also be referred to as "EGlass" or "switchable glass". Depending on the type of smart glass used, when activated by a voltage change or by some other electrical signal, the glass may change from transparent to translucent, diffusing or scattering some of the incident light. Alternatively, some types of smart glass may become completely opaque when a signal is applied, and other types may support a continuum of opacity and/or diffusivity. The extent to which a particular optical property of the smart glass is affected by the signal may depend on the strength of the signal in some embodiments—e.g., a larger voltage may result in less diffusion and more transparency or transmittance than a smaller voltage. In some implementations, more complex signals such as bursts or waves of different voltage levels may be used.

In at least some embodiments, polymer dispersed liquid crystal (PDLC) devices may be used to implement the smart glass layer. In PDLCs, liquid crystals may be dissolved or dispersed into a liquid polymer, followed by solidification or curing of the polymer. During the change of the polymer from a liquid to a solid, the liquid crystals may become incompatible with the solid polymer and form small drops or droplets. The curing conditions may affect the size of the droplets, which may in turn affect the final operating properties of the smart glass. A layer of transparent conductive material may be placed on each side of the solidified polymer in some embodiments to serve as electrodes for applying voltage differences to the polymer. A "sandwich" structure may thus be formed by the transparent electrodes and the polymer between the electrodes. In other embodiments other electrode placements may be used.

Electrodes from a power supply and/or control circuitry may be attached to the transparent electrodes in various embodiments. With one level of applied voltage (which may be zero in some implementations), the liquid crystals may remain arranged randomly in the droplets, resulting in scattering of light as it passes through the smart glass sandwich. This may result in a translucent, "milky white" or "frosted" appearance. When a different voltage is applied to the electrodes, the electric field formed between the two transparent electrodes on the glass may cause the liquid crystals to align, allowing light to pass through the droplets with very little scattering and resulting in a transparent state. The degree of transparency may be controlled by the applied voltage or current in some implementations. For example, at lower voltages only a few of the liquid crystals may align completely in the electric field, so only a small portion of the light passes through while most of the light is scattered. As the voltage is increased, fewer liquid crystals may remain out of alignment, resulting in less light being scattered. It may also be possible to use tinted or colored layers of PDLCs in some implementations, and to control the colors by signaling in a manner analogous to controlling the level of light scattering. In some implementations, near-complete opacity and/or near-complete transparency may be achieved using PDLCs, while in other implementations a more limited range of transparency may be achieved. Greater opacity may be achieved in some embodiments using multiple layers or films of PDLC stacked on each other, with each of the stacked layers contributing a respective reduction in transparency.

Figure 7A:
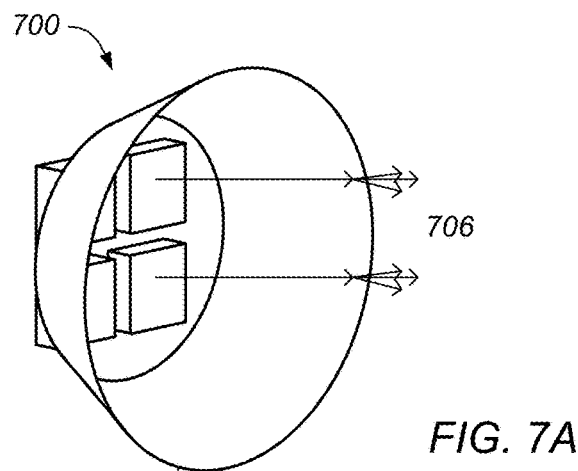
FIG. 7A-C illustrate a light source module that includes a light diffusing material with light diffusing properties that are adjustable based on applying a current or voltage, according to some embodiments.
Figure 7B:
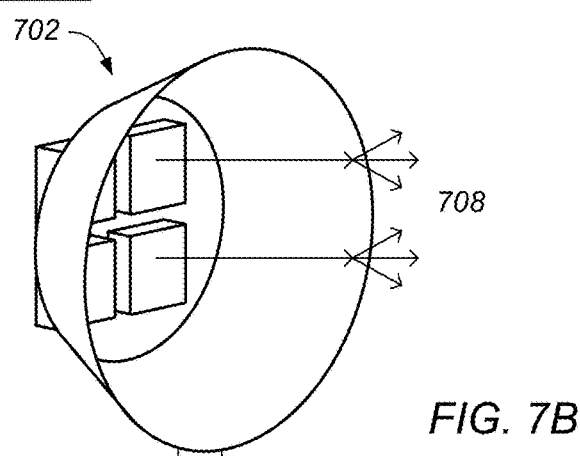
Figure 7C:
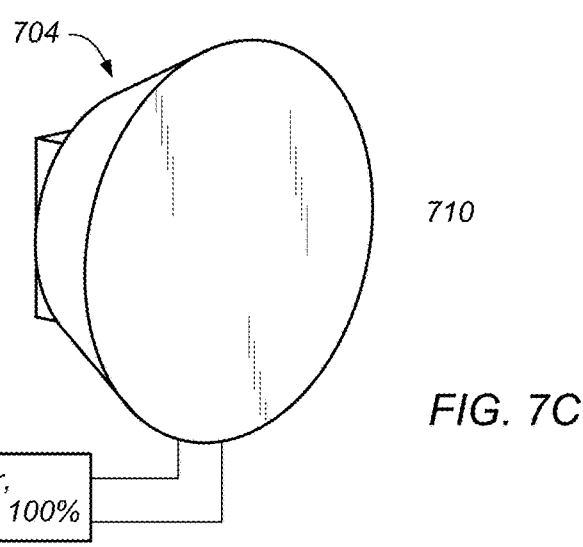

For example, FIGS. 7A-C illustrate a light source module with an electrically controllable light diffusing material in different control settings, according to some embodiments. In FIG. 7A, light source module 700 has a controller output of 0%, which may correspond to a particular voltage or current in some embodiments. Light 706 leaving light source module 700 is minimally scattered and a light diffusing material of light source module 700 may appear to be clear.

In FIG. 7B, light source module 702 has a controller output of 50%, which may correspond to a voltage or current that is approximately half of a control range supported by light source module 702. Light 708 leaving light source module 702 is more scattered than light 706 leaving light source module 700. The light diffusing material of light source module 702 may appear milky or hazy in some embodiments.

In FIG. 7C, a light source module 704 has a controller output of 100%, which may correspond to full range voltage or current of a control range supported by light source module 704. The light diffusing material of light source module 710 appears opaque and light does not pass through the light diffusing material. In some embodiments, a light source module, such as light source module 704 may remain in an opaque state when not in use. An opaque state of a light source module may hide internal components of the light source module from a user and provide a more aesthetically pleasing appearance. In some embodiments, a light source module may be embedded in a mobile device and in the opaque state, the light source module may blend into the mobile device to give a sleek appearance. Any of the light source modules described above may include an electrically controllable light diffusing material such as described in FIGS. 7A-C.

Figure 8A:
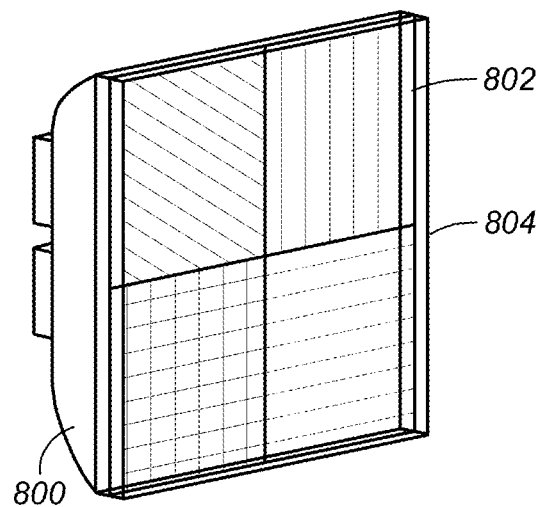
FIG. 8A-B illustrate a light source module that includes a segmented light diffusing material and an additional layer that has adjustable diffusion properties, according to some embodiments.
Figure 8B:
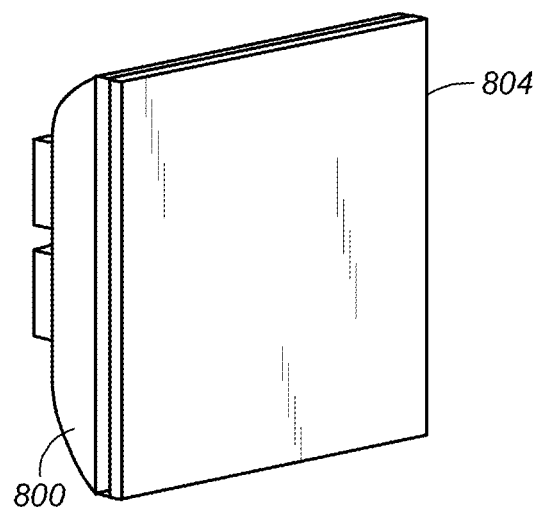

FIGS. 8A-B illustrate an electrically controllable light diffusing material layered with a segmented light diffusing material, according to some embodiments. An electrically controllable light diffusing material may be controlled to adjust its light diffusing properties and may be layered in front of or behind a segmented light diffusing material of a light source module, such as segmented light diffusing material 112, 114, 116, and 118 described in FIG. 1, or the segmented light diffusing material of light source module 300 described in FIG. 3. In some embodiments, the electrically controllable light diffusing material may alternate between clear and opaque depending on whether the light source module is being used to emit light. For example, FIG. 8A illustrates light source module 800 with segmented light diffusing material 802 and electrically controllable light diffusing material 804 layered on top of segmented light diffusing material 802. In FIG. 8A, electrically controllable light diffusing material 804 is in a clear state and light emitted from light source module 800 passes through electrically controllable light diffusing material 804 in the clear state. In FIG. 8B, light source module 800 is illustrated with electrically controllable light diffusing material 804 in an opaque state. In the opaque state, light does not pass through electrically controllable light source module 800. Also, in the opaque state, internal components of light source module 800 are not visible to a user of light source module 800.

In some embodiments, an electrically controllable light diffusing material, such as electrically controllable light diffusing material 804, may be controlled to adjust a level of diffusion of light, in a similar manner as light source modules 700, 702, and 704 described in regard to FIG. 7. In such embodiments, an electrically controllable light diffusing material may be used to further adjust levels of diffusion between different levels of diffusion supported by different segments of a segmented light diffusing material. For example, a segmented light diffusing material may have three segments with three different light diffusing properties, such as, no diffusion, medium diffusion, and high diffusion. An electrically controllable light diffusing material adjacent to the segmented light diffusing material may allow for adjustments between levels of diffusion supported by the segmented light diffusing material. For example, an illumination element associated with the medium diffusion segment may be illuminated and an electrically controllable light diffusing material may be adjusted to achieve a level of diffusion that is between the medium diffusion level and the high diffusion level. In another example, an illumination element associated with the no diffusion segment may be illuminated and an electrically controllable light diffusing material may be adjusted to achieve a level of diffusion that is between no diffusion and medium diffusion. As one skilled in the art will understand, several different combinations may be used to adjust the diffusion of light from a segmented light diffusing material that is combined with an electrically controllable light diffusing material.

Example of Controllably Adjusting Diffusion of Light to Illuminate a Scene

Figure 9:
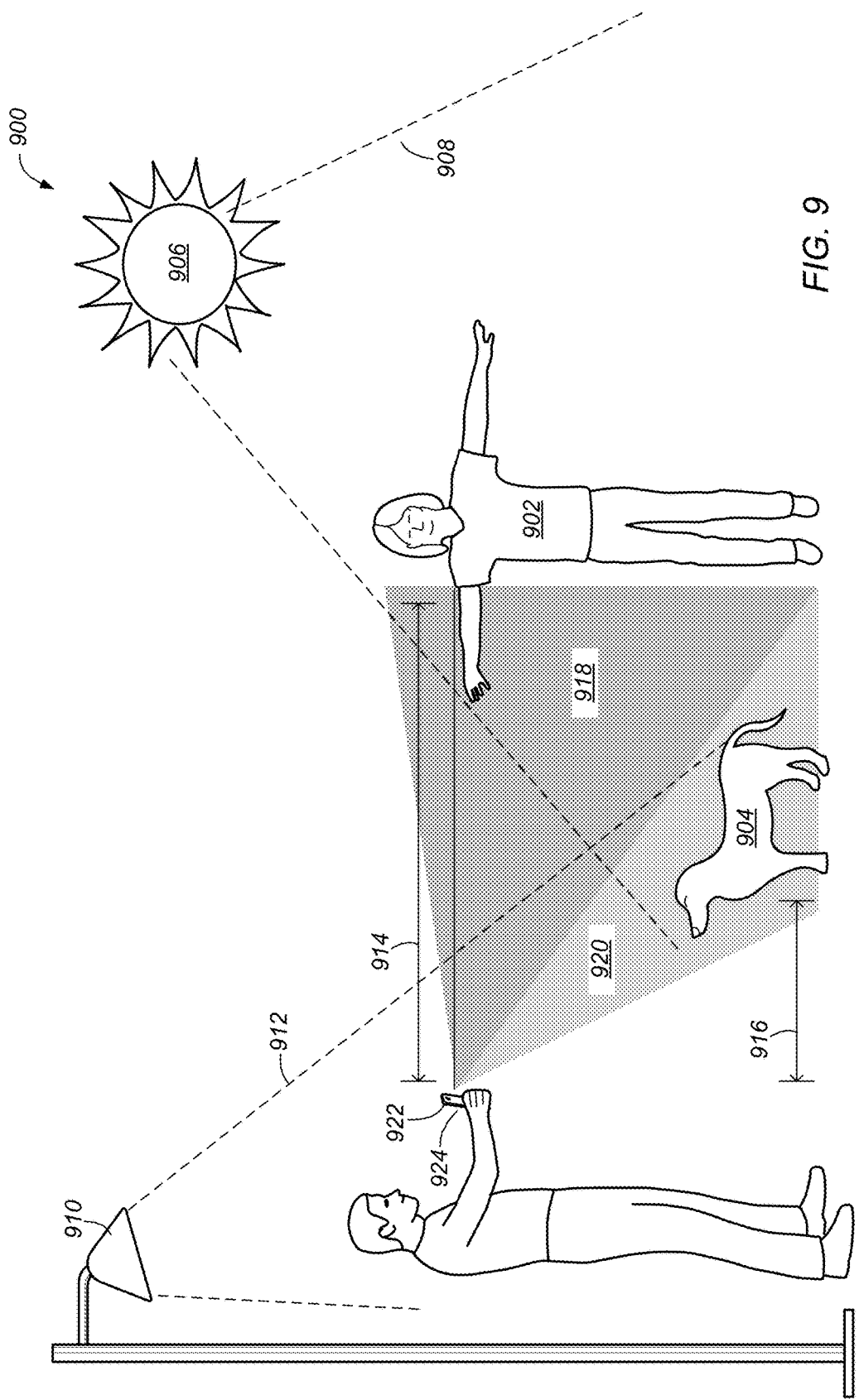
FIG. 9 illustrates a mobile computing device with an embedded light source module that adjusts the diffusion of light from the light source module based on detected subjects in a field of view, according to some embodiments.

A light source module may be configured to receive one or more control signals from a controller. The control signal may indicate separate levels of diffusion for light emitted from the light source module directed at separate portions of a scene to be illuminated by the light source module. In some embodiments, the control signals may indicate separate diffusivity adjustments for light emitted from separate illumination elements. For example, the control signal may indicate that a bottom portion of a scene is to be illuminated with more diffuse light than a top portion of the scene. By diffusing light in the bottom portion of the scene more than in the top portion of the scene the light source module may provide lighting that is tailored to the conditions of the scene. FIG. 9 illustrates an example of illuminating different portions of a scene with light that has different diffusion characteristics. For example, the top portion of a scene may include a subject, such as subject 902, that is at a distance, such as distance 914, from the light source module, such as light source module 922, while the bottom portion of the scene may include a second subject, such as subject 904, that is closer to the light source module than the first subject, for example distance 916. In this example, light that is diffused uniformly across the scene may not sufficiently illuminate one of the subjects, such as subject 902, that is at a greater distance from the light source module. Or, may illuminate the second subject, such as subject 904, in the bottom portion of the scene with concentrated light that results in hard lines and shadows (which is less than ideal).

However, by adjusting the diffusion of light in the bottom portion of the scene separately from the adjustment of the diffusion of light in the top portion of the scene, the light source module may provide light that is tailored to both portions of the scene. For example, light source module 922 may be embedded in mobile computing device 924. And mobile computing device may include one or more sensors that can detect the lighting conditions of subject 902 and subject 904. For example, mobile computing device 924 may determine that light 908 from the sun 906 is casting a shadow on subject 902. Mobile computing device 924 may also determine that light 912 from street light 910 is providing sufficient light to capture an image of subject 904. The mobile computing device may also determine that subject 902 is distance 914 from mobile computing device 924 that is greater than distance 916 that separates mobile computing device 924 from subject 904. A mobile computing device may identify subjects in a scene, determine lighting conditions and relative distances between subjects, and determine one or more adjustments of the diffusion of light that is to be used to illuminate the scene based on these and other variables. Based, on determined light diffusion adjustments, the mobile computing device may send one or more signal to the light source module and the light source module may adequately illuminate both subjects without over concentrating light on one of the subjects and causing harsh lines and shadows. And, without providing light that is too diffuse and that does not properly illuminate a farther away subject. For example, light source module 922 may illuminate the bottom portion of the scene that includes subject 904 with more diffuse light 920 and illuminate the top portion of the scene that includes subject 902 with less diffuse light 918. A light source module may diffuse light to compensate for multiple combinations of lighting conditions and direct light in different distribution arrangements, such as top half/bottom half of a scene, left side/right side of a scene, grid segments of a scene, and the like.

Additional Uses of a Light Source Module

In addition to illuminating a scene to be captured by a camera or video recorder, a light source module may be used as a flashlight, as an indicator to send visual notifications to users, as an emitter to transmit information via modulated light signals, or for other uses. When being used as a flashlight, an electrically adjustable light diffusing material, a segmented light diffusing material, or a combination of both may be used to adjust a beam of light emitted from a light source module. For example, a user of a mobile device with an embedded light source module may desire to have a wide beam of light when searching through an area and may desire to have a focused beam of light when working in a fixed location. A light source module, such as any of light source modules 106, 200, 300, 400, 500, 600, 700, or 800 may be used to adjust a beam of light when used in a flashlight mode. For example, a segmented light diffusing material may include segments that have a high diffusing property that scatters light and may include segments with a low diffusing property that allow light to pass through the segments with minimal diffusion. In a flashlight mode, a light source module may receive one or more signals to illuminate an illumination element associated with a high diffusing property segment when a wide light beam is desired and may receive on or more signals to illuminate an illumination element associated with a low diffusing property segment when a concentrated light beam is desired. In some embodiments, an electrically controllable light diffusing material may be used in a flash light mode to adjust a beam of light from a light source module between a wide beam and a concentrated or narrow beam.

Figure 10A:
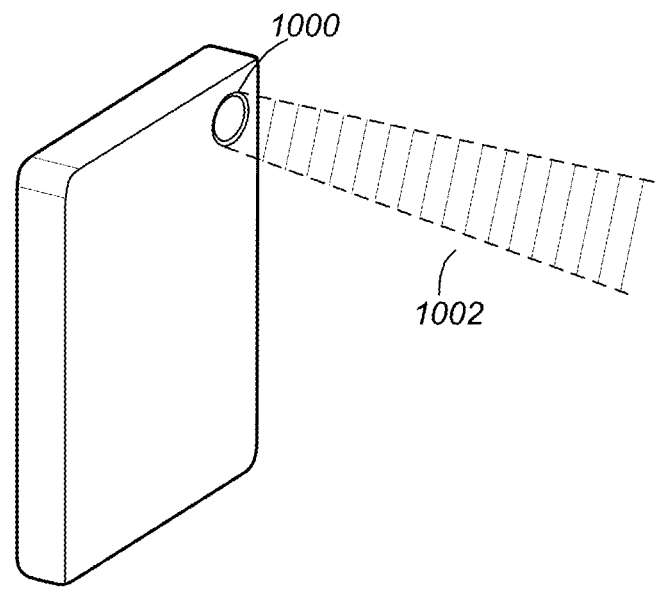
FIG. 10A-B illustrate a light source module embedded in a mobile computing device, according to some embodiments.
Figure 10B:
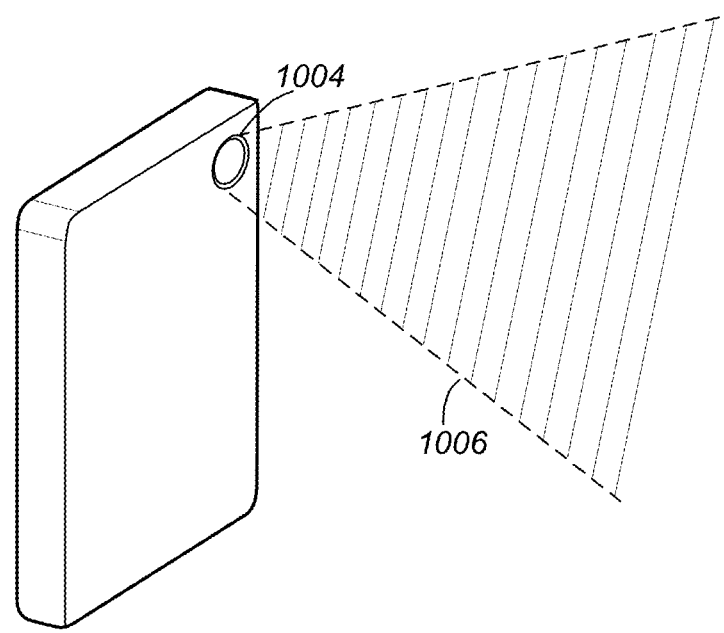

In some embodiments, a controller of a mobile device may interact with one or more other components of a mobile device to determine whether a light source module in a flash light mode should emit a wide beam of light or a concentrated or narrow beam of light. For example, a controller may interact with signals from one or more gyroscopes, accelerometers or other motion detecting devices to determine if a mobile device is scanning a wide area or is relatively still and focused on a single location. In response to determining that a mobile device is focused on a single location, a controller may switch from a wide beam mode to a narrow or concentrated light beam mode. In some embodiments, a controller may interact with a camera of a mobile device to detect objects in a scene and focus a light beam on one or more of the objects detected in the scene. For example, FIGS. 10A-B illustrates a light source module embedded in a mobile device in a flashlight mode. In FIG. 10A light source module 1000 is in a flashlight mode and in a narrow or concentrated beam mode. Light source module 1000 emits a narrow beam of light 1002. In FIG. 10B light source module 1004 is embedded in a mobile device and is in a flashlight mode and in a wide beam mode. Light source module 1004 emits a wide beam of light 1006. In some embodiments, light source modules may be embedded in a variety of devices including mobile computing devices such as phones, tablets, etc. and may be used in a flash light mode as described above.

Diffusion Control Methods

Figure 11:
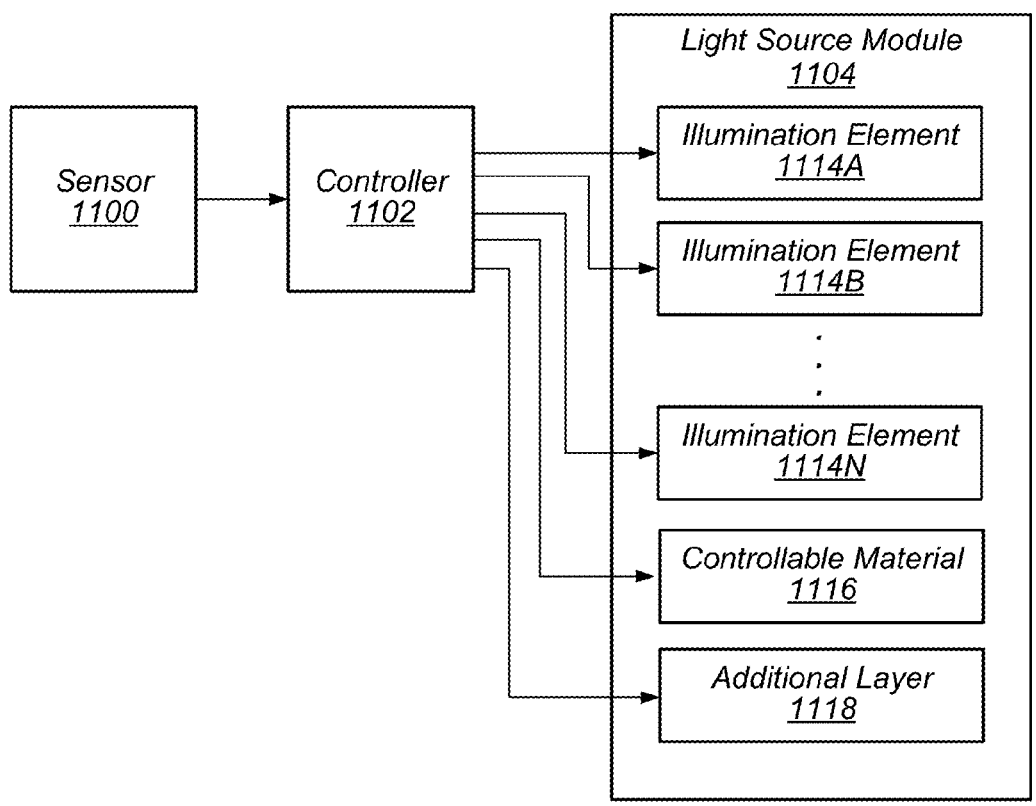
FIG. 11 illustrates a system including a controller that can adjust a level of diffusion of light emitted from a light source module, according to some embodiments.

FIG. 11 is a flowchart for controlling a light source module, according to some embodiments. A sensor, such as sensor 1100 detects a condition of a scene to be illuminated by a light source module. The sensor communicates with a controller, such as controller 1102, and the controller determines one or more illumination elements of a light source module to illuminate based on program instructions and the one or more signals from a sensor. A sensor may be a camera, a lighting detector, or other type of sensor that measures lighting conditions of a scene. In some embodiments, a controller, such as controller 1102, may be implemented in hardware or in software. In some embodiments, controller 1102 may be implemented by one or more processors and memory of a mobile device.

A light source module, such as light source module 1104, may comprise a single illumination element or may comprise any number of illumination elements, such as illumination elements 1114A-N. A light source module may comprise one or more electrically controllable diffusing materials, such as controllable material 1116, and may comprise an additional layer that changes from opaque to translucent, such as additional layer 118. A controller, such as controller 1102, may control individual illumination elements of other illumination elements of a light source module. For example, controller 1102 may instruct illumination element 1114A to illuminate but not instruct illumination element 1114B to illuminate and vice-versa. In some embodiments, a controller, such as controller 1102 may instruct a particular illumination element to illuminate at a particular illumination intensity. For example, controller 1102 may instruct illumination element 1114A to illuminate with an 80% illumination intensity.

A controller, such as controller 1102, may send one or more signals to a light source module comprising an electrically controllable light diffusing material, such as controllable material 1116, that includes an instruction to adjust one or more electrically controllable light diffusing materials in addition to signals instructing certain illumination elements to be illuminated. A controller, such as controller 1102, may instruct an electrically controllable light diffusing material, such as controllable material 1116 or additional layer 1118, to remain in an opaque state when light is not being emitted from a light source module, such as light source module 1104, and may instruct an electrically controllable light diffusing material, such as controllable material 1116 or additional layer 1118, to adjust to a clear or transparent state when light is being emitted from a light source module, such as light source module 1104. Any of the light source modules described above in regards to FIGS. 1-10 may receive one or more signals from a controller 1102.

Figure 12:
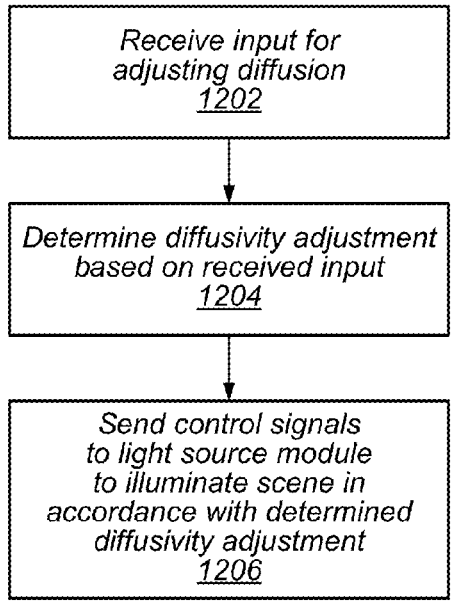
FIG. 12 is a flowchart of adjusting a level of diffusion, according to some embodiments.

FIG. 12 is a flowchart of a method for adjusting the diffusion of light emitted from a light source module, according to some embodiments. Such a method can be implemented with regard to any of the above embodiments, including any of the above embodiments of light source modules. The method can be at least partially implemented by one or more light source modules based on command signals received from one or more computer systems. In some embodiments, the method can be at least partially implemented by one or more computer systems.

At 1202, an input for adjusting diffusion of light from a light source module is received. In some embodiments, the input may be from a sensor that detects one or more lighting conditions of a scene, a camera that detects subjects in a scene, or from another source. In some embodiments, the input may be from a user interface that allows a user to select between a plurality of modes for illuminating a scene. In some embodiments the input may include a combination of the above described inputs.

At 1204, a controller, such as controller 1002 described in FIG. 11, determines a diffusivity adjustment based on the received inputs. For example, a controller may receive an input from a camera that there is a subject in the scene in the bottom left corner of the scene that is well lit, and that there is a subject in the top right corner of the scene that is farther away and not well lit. In this example, the controller may determine that the bottom left corner of the scene is to be illuminated with more diffuse light than the upper right corner. The controller may be part of a mobile device in which a light source module is embedded.

At 1206, one or more control signals is sent to a light source module to illuminate the scene in accordance with a determined diffusivity adjustment. In some embodiments the one or more control signals may be an electrical current that illuminates illumination elements that are determined to be illuminated in accordance with the diffusivity adjustment. In some embodiments, a control signal may instruct a light source module to illuminate determined illumination elements and the light source module may regulate an electrical current to illuminate the determined illumination elements. Also, the one or more control signals may include a control signal to adjust the diffusing property of an electrically controllable diffusing material. For example, a control signal may include the controller outputs described in FIGS. 7A-C. The one or more control signals may also include a control signal to adjust an illumination intensity of an illumination element. For example individual illumination elements may have adjustable illumination intensities. And, the one or more control signals may not only instruct particular illumination elements to illuminate, but also instruct the illumination elements to illuminate according to a desired illumination intensity. In some embodiments, a control signal may instruct one or more illumination elements that emit light of a particular color spectrum to illuminate.

Figure 13:
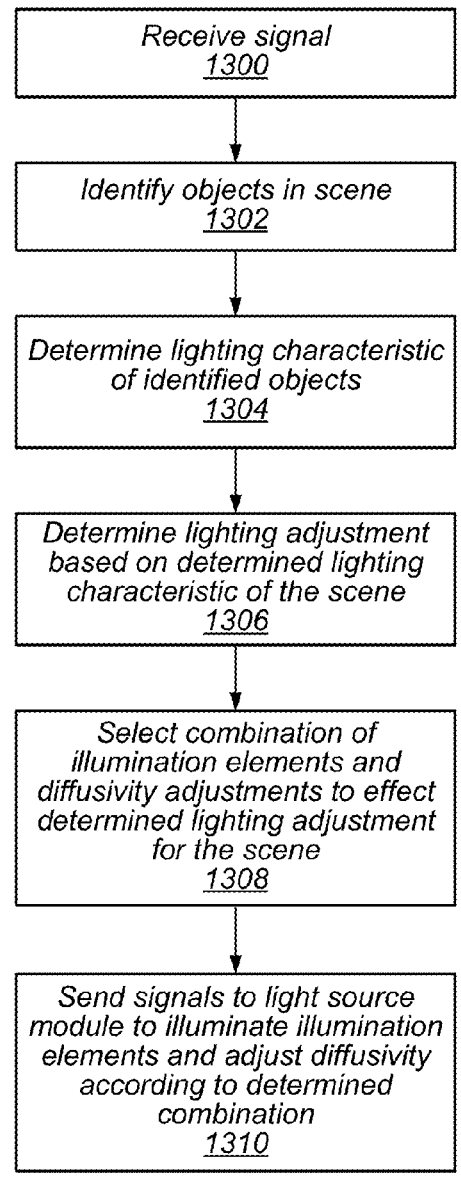
FIG. 13 is a flowchart of a method for adjusting a level of diffusion by a controller, according to some embodiments.

FIG. 13 is a flowchart of a method of adjusting the diffusion of light emitted from a light source module based on identifying objects in a scene, according to some embodiments.

At 1300, a signal is received. For example, the signal may be from a camera that is part of a mobile computing device that includes an embedded light source module.

At 1302, objects or subjects in a scene are identified. A controller, such as controller 1102 described above may include software that identifies subjects in a scene. For example, the controller may use facial recognition technology to identify people in a scene. In some embodiments, software components in a mobile computing device may identify objects or subjects in a scene and communicate the results to a controller, such as controller 1102.

At 1304, lighting characteristics are determined for the objects or subjects identified in a scene. A controller, such as controller 1102, may use signal inputs such as signals from a lighting detector to determine lighting conditions. A controller, such as controller 1102, may also use signal inputs that correspond to a distance from a mobile computing device to the identified objects or subjects in a scene. In some embodiments, a mobile computing device may use a camera to identify objects or subjects in a scene and to determine relative distances to the objects or subjects. In some embodiments, a mobile computing device may use input from a camera of the mobile device to determine lighting characteristics of identified objects or subjects in a scene.

At 1306, lighting adjustments for a scene are determined based on the lighting characteristics for the objects or subjects identified in the scene. A controller, such as controller 1102, may determine lighting adjustments for separate portions of a scene. For example, lighting adjustments may include illuminating portions of a scene with diffuse or concentrated light, increasing or decreasing the color temperature of portions of a scene by illuminating the portions of a scene with particular colors of light. Adjustments may also include adjusting the illumination intensity of one or more illumination elements that are to be used to illuminate a scene. A controller, such as controller 1102, may make other adjustments when a light source module is used in a flashlight mode, as an indicator to send visual notifications to users, as an emitter to transmit information via modulated light signals, or for other uses.

At 1308, combinations of illumination elements and diffusivity adjustments are selected to effect the lighting adjustments for a scene determined in step 1306. In some embodiments, a light source module may include an array of illumination elements where each illumination element is associated with a segment of a light diffusing material. And, at least some of the segments of the light diffusing material may have different light diffusing properties than other segments of the light diffusing material. A controller, such as controller 1102, may determine a combination of illumination elements with associated light diffusing material segments with particular light diffusing properties that achieve the determined lighting adjustment for the scene. In some embodiments, a light source module may include an array of illumination elements where individual illumination elements emit light that is of a different color spectrum than at least some of the other illumination elements of an illumination array of a light source module. A controller, such as controller 1102, may determine a combination of illumination elements that emit different colored light that achieve the determined lighting adjustment for the scene. In some embodiments, an electrically controllable light diffusing material may be adjusted by controlling a current or voltage supplied to the electrically controllable light diffusing material to achieve the determined lighting adjustment for the scene. In some embodiments, an electrically controllable light diffusing material may be layered with a segmented light diffusing material with separate illumination elements, and a controller may select a combination of segments of a segmented light diffusing material along with adjusting a diffusivity of an electrically controllable light diffusing material layered with the segmented light diffusing material to achieve the determined lighting adjustment for the scene. In some embodiments, an electrically controllable light diffusing material may be layered with a segmented light diffusing material that has segments associated with illumination elements that emit light of different color spectra. And, the electrically controllable light diffusing material may be adjusted to blend the colors from the different illumination elements.

At 1310, one or more control signals are sent to a light source module to illuminate illumination elements and adjust diffusivity in accordance with the combinations and adjustments determined at step 1308. In some embodiments, the one or more signals may include current or voltage that supplies power to the illumination elements to cause the illumination elements to illuminate or causes an electrically controllable light diffusing material to adjust its diffusion properties. In some embodiments the one or more signals may include instructions that are sent to a light source module that causes illumination elements and electrically controllable light diffusing materials to illuminate or adjust in accordance with the one or more control signals.

Multifunction Device Examples

Embodiments of electronic devices in which embodiments of light source modules, camera modules, light diffusion control modules, etc. as described herein may be used, user interfaces for such devices, and associated processes for using such devices are described. As noted above, in some embodiments, light source modules, camera modules, light diffusion control modules, etc. can be included in a mobile computing device which can include a camera device. In some embodiments, the device is a portable communications device, such as a mobile telephone, that also contains other functions, such as PDA and/or music player functions. Other portable electronic devices, such as laptops, cell phones, pad devices, or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad). In some embodiments, the device is a gaming computer with orientation sensors (e.g., orientation sensors in a gaming controller). In other embodiments, the device is not a portable communications device, but is a camera device.

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use one or more common physical user-interface devices, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with cameras. FIG. 14B is a block diagram illustrating portable multifunction device 1400 with camera 1470 in accordance with some embodiments. FIG. 14B illustrates camera 1470, which is sometimes called an "optical sensor" for convenience, and may also be known as or called an optical sensor system. In addition, multifunction device 1400 includes optical sensor 1464 illustrated in FIG. 14A on an opposite side of multifunction device 1400 from camera 1470.

Figure 14A:
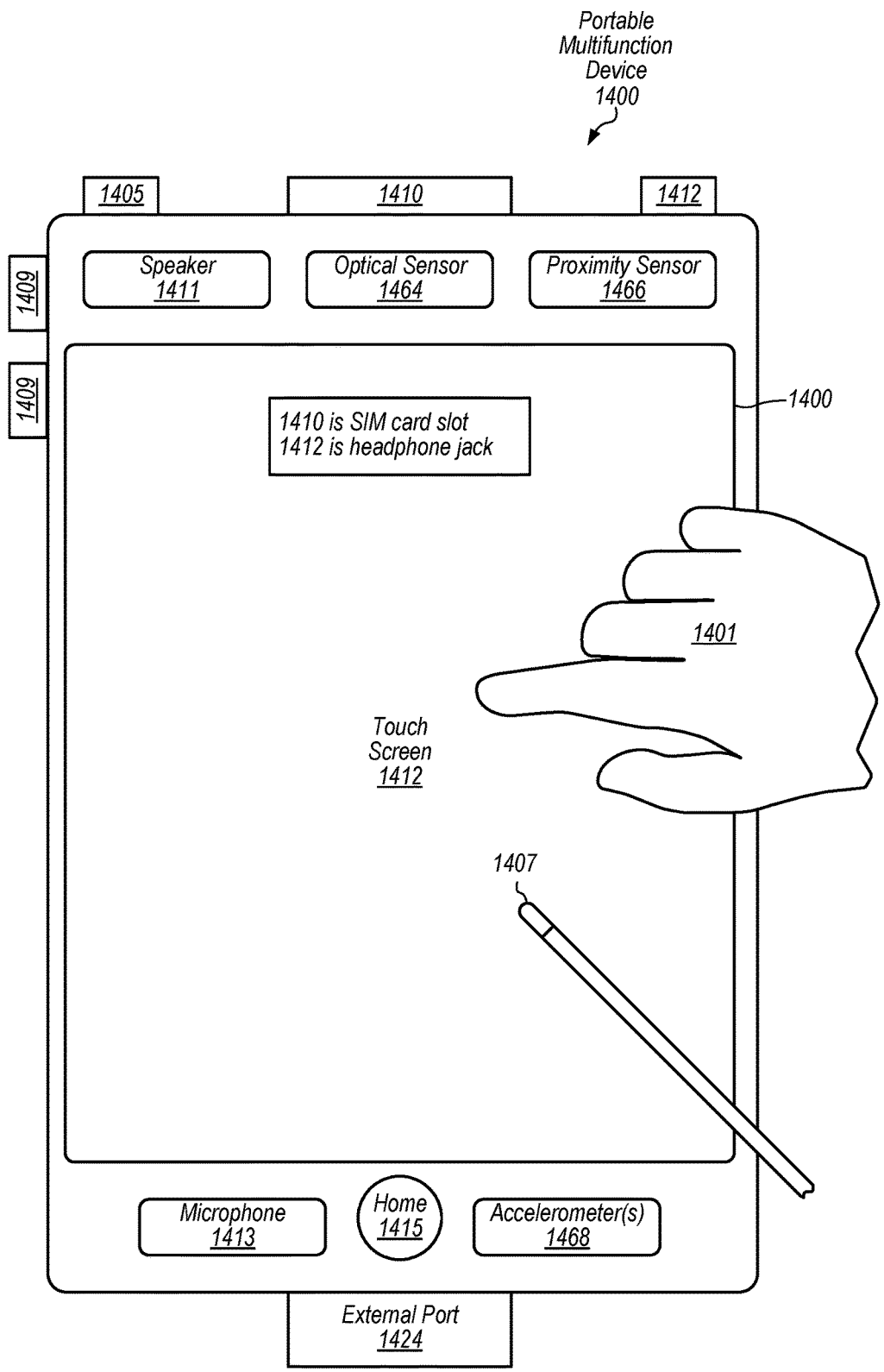
FIG. 14A-C illustrate a portable multifunction device with an embedded light source module, according to some embodiments.
Figure 14B:
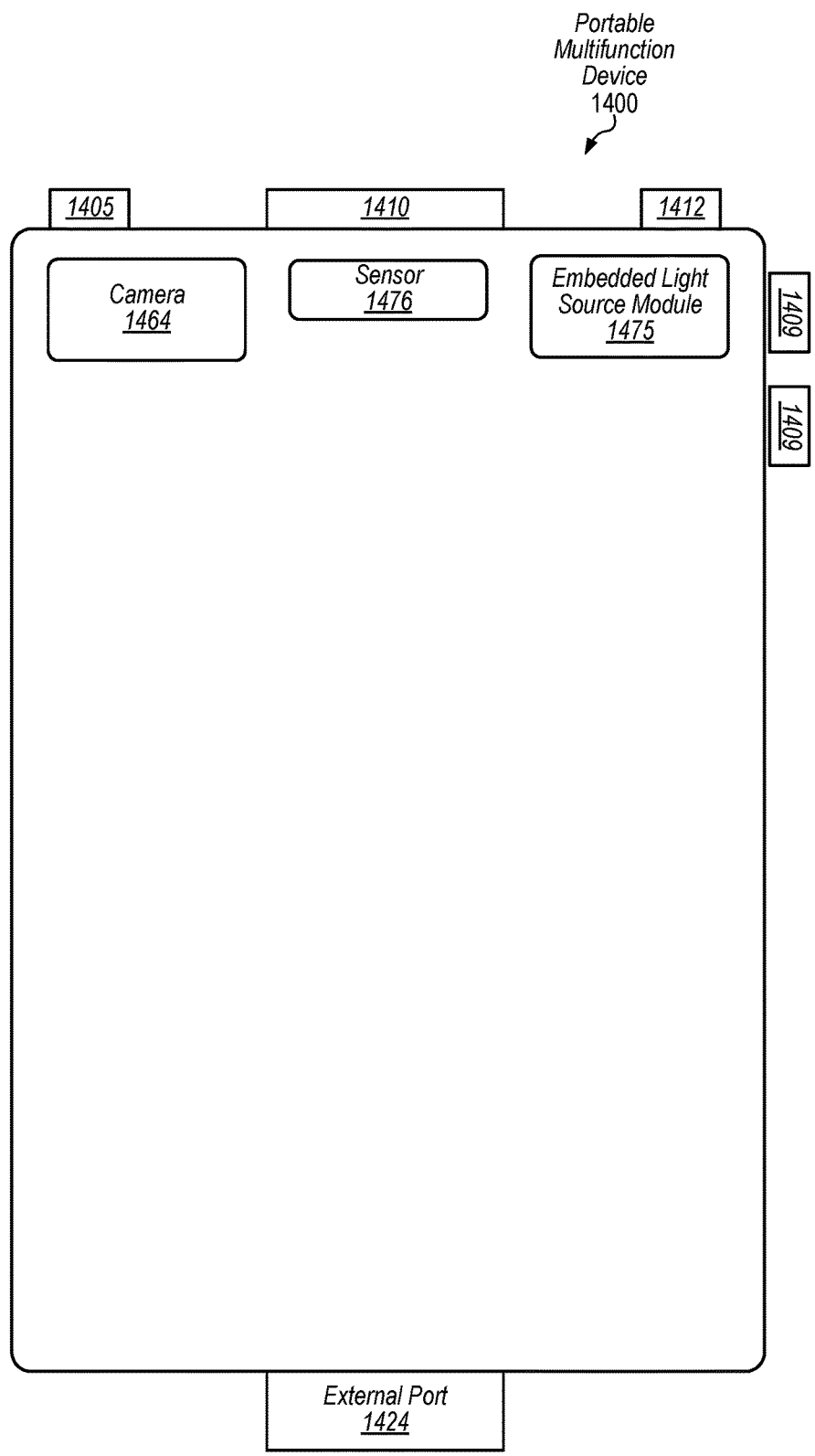
Figure 14C:
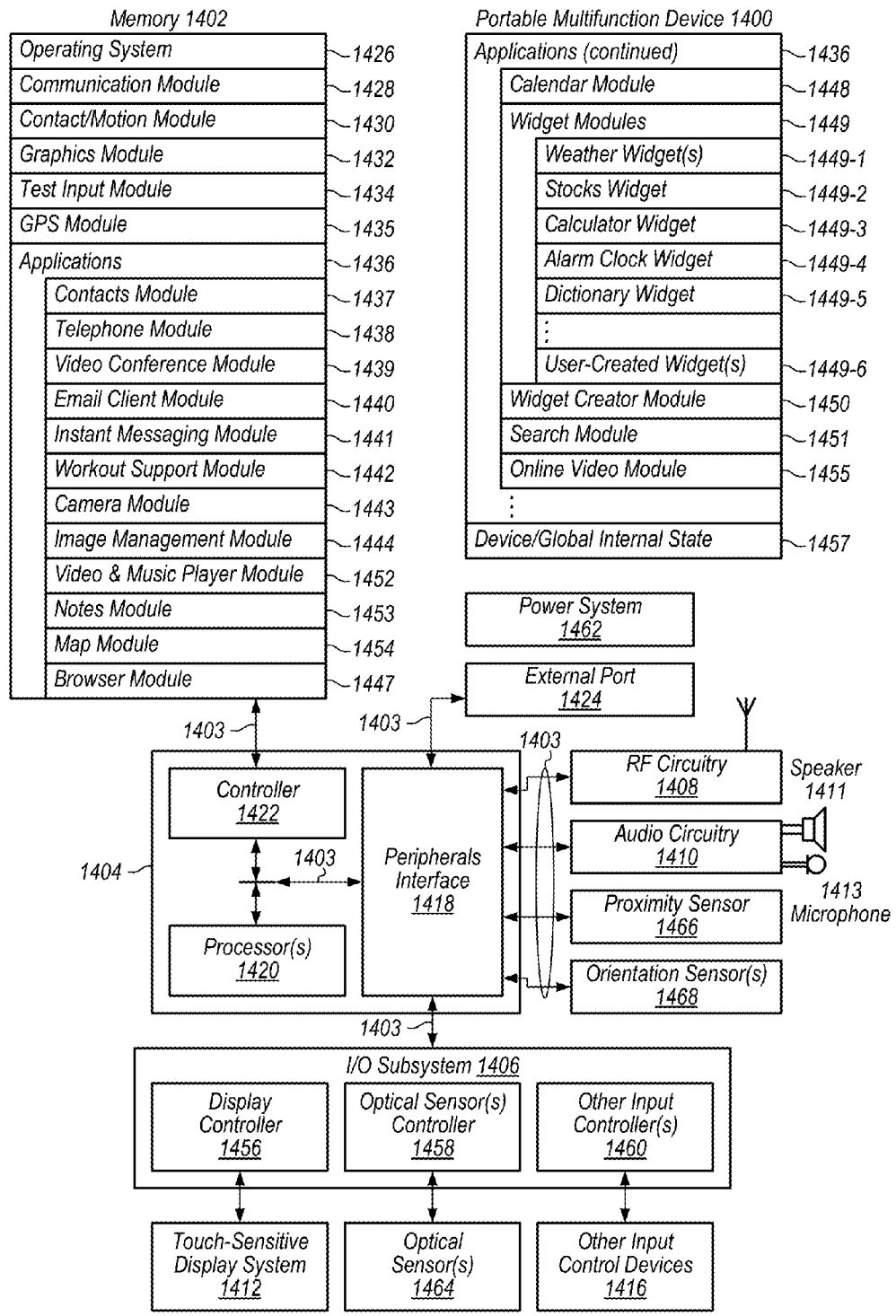

Referring to FIG. 14C, device 1400 may include memory 1402 (which may include one or more computer readable storage mediums), memory controller 1422, one or more processing units (CPU's) 1420, peripherals interface 1418, RF circuitry 1408, audio circuitry 1410, speaker 1411, touch-sensitive display system 1412, microphone 1413, input/output (I/O) subsystem 1406, other input or control devices 1416, and external port 1424. Device 1400 may include one or more optical sensors 1464. These components may communicate over one or more communication buses or signal lines 1403.

It should be appreciated that device 1400 is only one example of a portable multifunction device, and that device 1400 may have more or fewer components than shown, may combine two or more components, or may have a different configuration or arrangement of the components. The various components shown in FIG. 14C may be implemented in hardware, software, or a combination of hardware and software, including one or more signal processing and/or application specific integrated circuits.

Memory 1402 may include high-speed random access memory and may also include non-volatile memory, such as one or more magnetic disk storage devices, flash memory devices, or other non-volatile solid-state memory devices. Access to memory 1402 by other components of device 1400, such as CPU 1420 and the peripherals interface 1418, may be controlled by memory controller 1422.

Peripherals interface 1418 can be used to couple input and output peripherals of the device to CPU 1420 and memory 1402. The one or more processors 1420 run or execute various software programs and/or sets of instructions stored in memory 1402 to perform various functions for device 1400 and to process data.

In some embodiments, peripherals interface 1418, CPU 1420, and memory controller 1422 may be implemented on a single chip, such as chip 1404. In some other embodiments, they may be implemented on separate chips.

RF (radio frequency) circuitry 1408 receives and sends RF signals, also called electromagnetic signals. RF circuitry 1408 converts electrical signals to/from electromagnetic signals and communicates with communications networks and other communications devices via the electromagnetic signals. RF circuitry 1408 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 1408 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a variety of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 1410, speaker 1411, and microphone 1413 provide an audio interface between a user and device 1400. Audio circuitry 1410 receives audio data from peripherals interface 1418, converts the audio data to an electrical signal, and transmits the electrical signal to speaker 1411. Speaker 1411 converts the electrical signal to human-audible sound waves. Audio circuitry 1410 also receives electrical signals converted by microphone 1413 from sound waves. Audio circuitry 1410 converts the electrical signal to audio data and transmits the audio data to peripherals interface 1418 for processing. Audio data may be retrieved from and/or transmitted to memory 102 and/or RF circuitry 1408 by peripherals interface 1418. In some embodiments, audio circuitry 1410 also includes a headset jack (e.g., 1412, FIG. 14A-B). The headset jack provides an interface between audio circuitry 1410 and removable audio input/output peripherals, such as output-only headphones or a headset with both output (e.g., a headphone for one or both ears) and input (e.g., a microphone).

I/O subsystem 1406 couples input/output peripherals on device 1400, such as touch screen 1412 and other input control devices 1416, to peripherals interface 1418. I/O subsystem 1406 may include display controller 1456 and one or more input controllers 1460 for other input or control devices. The one or more input controllers 1416 receive/send electrical signals from/to other input or control devices 1416. The other input control devices 1416 may include physical buttons (e.g., push buttons, rocker buttons, etc.), dials, slider switches, joysticks, click wheels, and so forth. In some alternative embodiments, input controller(s) 1460 may be coupled to any (or none) of the following: a keyboard, infrared port, USB port, and a pointer device such as a mouse. The one or more buttons (e.g., 1409, FIG. 14A-B) may include an up/down button for volume control of speaker 1411 and/or microphone 1413. The one or more buttons may include a push button (e.g., 1405, FIG. 14A-B).

Touch-sensitive display 1412 provides an input interface and an output interface between the device and a user. Display controller 1456 receives and/or sends electrical signals from/to touch screen 1412. Touch screen 1412 displays visual output to the user. The visual output may include graphics, text, icons, video, and any combination thereof (collectively termed "graphics"). In some embodiments, some or all of the visual output may correspond to user-interface objects.

Touch screen 1412 has a touch-sensitive surface, sensor or set of sensors that accepts input from the user based on haptic and/or tactile contact. Touch screen 1412 and display controller 1456 (along with any associated modules and/or sets of instructions in memory 1402) detect contact (and any movement or breaking of the contact) on touch screen 1412 and converts the detected contact into interaction with user-interface objects (e.g., one or more soft keys, icons, web pages or images) that are displayed on touch screen 1412. In an example embodiment, a point of contact between touch screen 1412 and the user corresponds to a finger of the user.

Touch screen 1412 may use LCD (liquid crystal display) technology, LPD (light emitting polymer display) technology, or LED (light emitting diode) technology, although other display technologies may be used in other embodiments. Touch screen 1412 and display controller 1456 may detect contact and any movement or breaking thereof using any of a variety of touch sensing technologies now known or later developed, including but not limited to capacitive, resistive, infrared, and surface acoustic wave technologies, as well as other proximity sensor arrays or other elements for determining one or more points of contact with touch screen 1412. In an example embodiment, projected mutual capacitance sensing technology may be used.

Touch screen 1412 may have a video resolution in excess of 100 dots per inch (dpi). In some embodiments, the touch screen has a video resolution of approximately 160 dpi. The user may make contact with touch screen 1412 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 1400 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 1412 or an extension of the touch-sensitive surface formed by the touch screen.

Device 1400 also includes power system 1462 for powering the various components. Power system 1462 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 1400 may also include one or more optical sensors or cameras 1464. FIG. 14C shows an optical sensor coupled to optical sensor controller 1458 in I/O subsystem 1406. Optical sensor 1464 may include charge-coupled device (CCD) or complementary metal-oxide semiconductor (CMOS) phototransistors. Optical sensor 1464 receives light from the environment, projected through one or more lens, and converts the light to data representing an image. In conjunction with imaging module 1443 (also called a camera module), optical sensor 1464 may capture still images or video. In some embodiments, an optical sensor is located on the back of device 1400, opposite touch screen display 1412 on the front of the device, so that the touch screen display may be used as a viewfinder for still and/or video image acquisition. In some embodiments, another optical sensor is located on the front of the device so that the user's image may be obtained for videoconferencing while the user views the other videoconference participants on the touch screen display.

Device 1400 may also include one or more proximity sensors 1466. FIG. 14C shows proximity sensor 1466 coupled to peripherals interface 1418. Alternatively, proximity sensor 1466 may be coupled to input controller 1460 in I/O subsystem 1406. In some embodiments, the proximity sensor turns off and disables touch screen 1412 when the multifunction device is placed near the user's ear (e.g., when the user is making a phone call).

Device 1400 includes one or more orientation sensors 1468. In some embodiments, the one or more orientation sensors include one or more accelerometers (e.g., one or more linear accelerometers and/or one or more rotational accelerometers). In some embodiments, the one or more orientation sensors include one or more gyroscopes. In some embodiments, the one or more orientation sensors include one or more magnetometers. In some embodiments, the one or more orientation sensors include one or more of global positioning system (GPS), Global Navigation Satellite System (GLONASS), and/or other global navigation system receivers. The GPS, GLONASS, and/or other global navigation system receivers may be used for obtaining information concerning the location and orientation (e.g., portrait or landscape) of device 1400. In some embodiments, the one or more orientation sensors include any combination of orientation/rotation sensors. FIG. 14C shows the one or more orientation sensors 1468 coupled to peripherals interface 1418. Alternatively, the one or more orientation sensors 1468 may be coupled to an input controller 1460 in I/O subsystem 1406. In some embodiments, information is displayed on the touch screen display in a portrait view or a landscape view based on an analysis of data received from the one or more orientation sensors.

In some embodiments, the software components stored in memory 1402 include operating system 1426, communication module (or set of instructions) 1428, contact/motion module (or set of instructions) 1430, graphics module (or set of instructions) 1432, text input module (or set of instructions) 1434, Global Positioning System (GPS) module (or set of instructions) 1435, and applications (or sets of instructions) 1436. Furthermore, in some embodiments memory 1402 stores device/global internal state 1457. Device/global internal state 1457 includes one or more of: active application state, indicating which applications, if any, are currently active; display state, indicating what applications, views or other information occupy various regions of touch screen display 1412; sensor state, including information obtained from the device's various sensors and input control devices 1416; and location information concerning the device's location and/or attitude.

Operating system 1426 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 1428 facilitates communication with other devices over one or more external ports 1424 and also includes various software components for handling data received by RF circuitry 1408 and/or external port 1424. External port 1424 (e.g., Universal Serial Bus (USB), FIREWIRE, etc.) is adapted for coupling directly to other devices or indirectly over a network (e.g., the Internet, wireless LAN, etc.).

Contact/motion module 1430 may detect contact with touch screen 1412 (in conjunction with display controller 1456) and other touch sensitive devices (e.g., a touchpad or physical click wheel). Contact/motion module 1430 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 1430 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 1430 and display controller 1456 detect contact on a touchpad.

Contact/motion module 1430 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 1432 includes various known software components for rendering and displaying graphics on touch screen 1412 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 1432 stores data representing graphics to be used. Each graphic may be assigned a corresponding code. Graphics module 1432 receives, from applications etc., one or more codes specifying graphics to be displayed along with, if necessary, coordinate data and other graphic property data, and then generates screen image data to output to display controller 1456.

Text input module 1434, which may be a component of graphics module 1432, provides soft keyboards for entering text in various applications (e.g., contacts 1437, e-mail 1440, IM 141, browser 1447, and any other application that needs text input).

GPS module 1435 determines the location of the device and provides this information for use in various applications (e.g., to telephone 1438 for use in location-based dialing, to camera module 1443 as picture/video metadata, and to applications that provide location-based services such as weather widgets, local yellow page widgets, and map/navigation widgets).

Applications 1436 may include the following modules (or sets of instructions), or a subset or superset thereof:

contacts module 1437 (sometimes called an address book or contact list);
telephone module 1438;
video conferencing module 1439;
e-mail client module 1440;
instant messaging (IM) module 1441;
workout support module 1442;
camera module 1443 for still and/or video images;
image management module 1444;
browser module 1447;
calendar module 1448;
widget modules 1449, which may include one or more of: weather widget 1449-1, stocks widget 1449-2, calculator widget 1449-3, alarm clock widget 1449-4, dictionary widget 1449-5, and other widgets obtained by the user, as well as user-created widgets 1449-6;
widget creator module 1450 for making user-created widgets 1449-6;
search module 1451;
video and music player module 1452, which may be made up of a video player
module and a music player module;
notes module 1453;
map module 1454; and/or
online video module 1455.

Examples of other applications 1436 that may be stored in memory 1402 include other word processing applications, other image editing applications, drawing applications, presentation applications, JAVA-enabled applications, encryption, digital rights management, voice recognition, and voice replication.

In conjunction with touch screen 1412, display controller 1456, contact module 1430, graphics module 1432, and text input module 1434, contacts module 1437 may be used to manage an address book or contact list (e.g., stored in application internal state 1492 of contacts module 1437 in memory 1402), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 1438, video conference 1439, e-mail 1440, or IM 1441; and so forth.

In conjunction with RF circuitry 1408, audio circuitry 1410, speaker 1411, microphone 1413, touch screen 1412, display controller 1456, contact module 1430, graphics module 1432, and text input module 1434, telephone module 1438 may be used to enter a sequence of characters corresponding to a telephone number, access one or more telephone numbers in address book 1437, modify a telephone number that has been entered, dial a respective telephone number, conduct a conversation and disconnect or hang up when the conversation is completed. As noted above, the wireless communication may use any of a variety of communications standards, protocols and technologies.

In conjunction with RF circuitry 1408, audio circuitry 1410, speaker 1411, microphone 1413, touch screen 1412, display controller 1456, optical sensor 1464, optical sensor controller 1458, contact module 1430, graphics module 1432, text input module 1434, contact list 1437, and telephone module 1438, videoconferencing module 1439 includes executable instructions to initiate, conduct, and terminate a video conference between a user and one or more other participants in accordance with user instructions.

In conjunction with RF circuitry 1408, touch screen 1412, display controller 1456, contact module 1430, graphics module 1432, and text input module 1434, e-mail client module 1440 includes executable instructions to create, send, receive, and manage e-mail in response to user instructions. In conjunction with image management module 1444, e-mail client module 1440 makes it very easy to create and send e-mails with still or video images taken with camera module 1443.

In conjunction with RF circuitry 1408, touch screen 1412, display controller 1456, contact module 1430, graphics module 1432, and text input module 1434, the instant messaging module 1441 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 1408, touch screen 1412, display controller 1456, contact module 1430, graphics module 1432, text input module 1434, GPS module 1435, map module 1454, and music player module 1446, workout support module 1442 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 1412, display controller 1456, optical sensor(s) 1464, optical sensor controller 1458, embedded light source module 1475, sensor 1476, contact module 1430, graphics module 1432, and image management module 1444, camera module 1443 includes executable instructions to capture still images or video (including a video stream) and store them into memory 1402, modify characteristics of a still image or video, or delete a still image or video from memory 1402.

In conjunction with touch screen 1412, display controller 1456, contact module 1430, graphics module 1432, text input module 1434, embedded light source module 1475, sensor 1476, and camera module 1443, image management module 1444 includes executable instructions to arrange, modify (e.g., edit), or otherwise manipulate, label, delete, present (e.g., in a digital slide show or album), and store still and/or video images.

In conjunction with RF circuitry 1408, touch screen 1412, display system controller 1456, contact module 1430, graphics module 1432, and text input module 1434, browser module 1447 includes executable instructions to browse the Internet in accordance with user instructions, including searching, linking to, receiving, and displaying web pages or portions thereof, as well as attachments and other files linked to web pages.

In conjunction with RF circuitry 1408, touch screen 1412, display system controller 1456, contact module 1430, graphics module 1432, text input module 1434, e-mail client module 1440, and browser module 1447, calendar module 1448 includes executable instructions to create, display, modify, and store calendars and data associated with calendars (e.g., calendar entries, to do lists, etc.) in accordance with user instructions.

In conjunction with RF circuitry 1408, touch screen 1412, display system controller 1456, contact module 1430, graphics module 1432, text input module 1434, and browser module 1447, widget modules 1449 are mini-applications that may be downloaded and used by a user (e.g., weather widget 1449-1, stocks widget 1449-2, calculator widget 14493, alarm clock widget 1449-4, and dictionary widget 1449-5) or created by the user (e.g., user-created widget 1449-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 1408, touch screen 1412, display system controller 1456, contact module 1430, graphics module 1432, text input module 1434, and browser module 1447, the widget creator module 1450 may be used by a user to create widgets (e.g., turning a user-specified portion of a web page into a widget).

In conjunction with touch screen 1412, display system controller 1456, contact module 1430, graphics module 1432, and text input module 1434, search module 1451 includes executable instructions to search for text, music, sound, image, video, and/or other files in memory 1402 that match one or more search criteria (e.g., one or more user-specified search terms) in accordance with user instructions.

In conjunction with touch screen 1412, display system controller 1456, contact module 1430, graphics module 1432, audio circuitry 1410, speaker 1411, RF circuitry 1408, and browser module 1447, video and music player module 1452 includes executable instructions that allow the user to download and play back recorded music and other sound files stored in one or more file formats, such as MP3 or AAC files, and executable instructions to display, present or otherwise play back videos (e.g., on touch screen 1412 or on an external, connected display via external port 1424). In some embodiments, device 1400 may include the functionality of an MP3 player.

In conjunction with touch screen 1412, display controller 1456, contact module 1430, graphics module 1432, and text input module 1434, notes module 1453 includes executable instructions to create and manage notes, to do lists, and the like in accordance with user instructions.

In conjunction with RF circuitry 1408, touch screen 1412, display system controller 1456, contact module 1430, graphics module 1432, text input module 1434, GPS module 1435, and browser module 1447, map module 1454 may be used to receive, display, modify, and store maps and data associated with maps (e.g., driving directions; data on stores and other points of interest at or near a particular location; and other location-based data) in accordance with user instructions.

In conjunction with touch screen 1412, display system controller 1456, contact module 1430, graphics module 1432, audio circuitry 1410, speaker 1411, RF circuitry 1408, text input module 1434, e-mail client module 1440, and browser module 1447, online video module 1455 includes instructions that allow the user to access, browse, receive (e.g., by streaming and/or download), play back (e.g., on the touch screen or on an external, connected display via external port 1424), send an e-mail with a link to a particular online video, and otherwise manage online videos in one or more file formats, such as H.264. In some embodiments, instant messaging module 1441, rather than e-mail client module 1440, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 1402 may store a subset of the modules and data structures identified above. Furthermore, memory 1402 may store additional modules and data structures not described above.

In some embodiments, device 1400 is a device where operation of a predefined set of functions on the device is performed exclusively through a touch screen and/or a touchpad. By using a touch screen and/or a touchpad as the primary input control device for operation of device 1400, the number of physical input control devices (such as push buttons, dials, and the like) on device 1400 may be reduced.

The predefined set of functions that may be performed exclusively through a touch screen and/or a touchpad include navigation between user interfaces. In some embodiments, the touchpad, when touched by the user, navigates device 1400 to a main, home, or root menu from any user interface that may be displayed on device 1400. In such embodiments, the touchpad may be referred to as a "menu button." In some other embodiments, the menu button may be a physical push button or other physical input control device instead of a touchpad.

FIG. 14A-B illustrates a portable multifunction device 1400 having a touch screen 1412 in accordance with some embodiments. The touch screen may display one or more graphics within a user interface (UI). In this embodiment, as well as others described below, a user may select one or more of the graphics by making a gesture on the graphics, for example, with one or more fingers 1401 (not drawn to scale in the Figure) or one or more styluses 1407 (not drawn to scale in the figure).

Device 1400 may also include one or more physical buttons, such as "home" or menu button 1415. As described previously, menu button 1415 may be used to navigate to any application 1436 in a set of applications that may be executed on device 1400. Alternatively, in some embodiments, the menu button is implemented as a soft key in a graphics user interface (GUI) displayed on touch screen 1412.

In one embodiment, device 1400 includes touch screen 1412, menu button 1415, push button 1405 for powering the device on/off and locking the device, volume adjustment button(s) 1409, Subscriber Identity Module (SIM) card slot 1410, head set jack 1412, and docking/charging external port 1424. Push button 1405 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 1400 also may accept verbal input for activation or deactivation of some functions through microphone 1413.

It should be noted that, although many of the examples herein are given with reference to optical sensor/camera 1464 (on the front of a device), a rear-facing camera or optical sensor that is pointed opposite from the display may be used instead of or in addition to an optical sensor/camera 1464 on the front of a device.

Example Computer System

Figure 15:
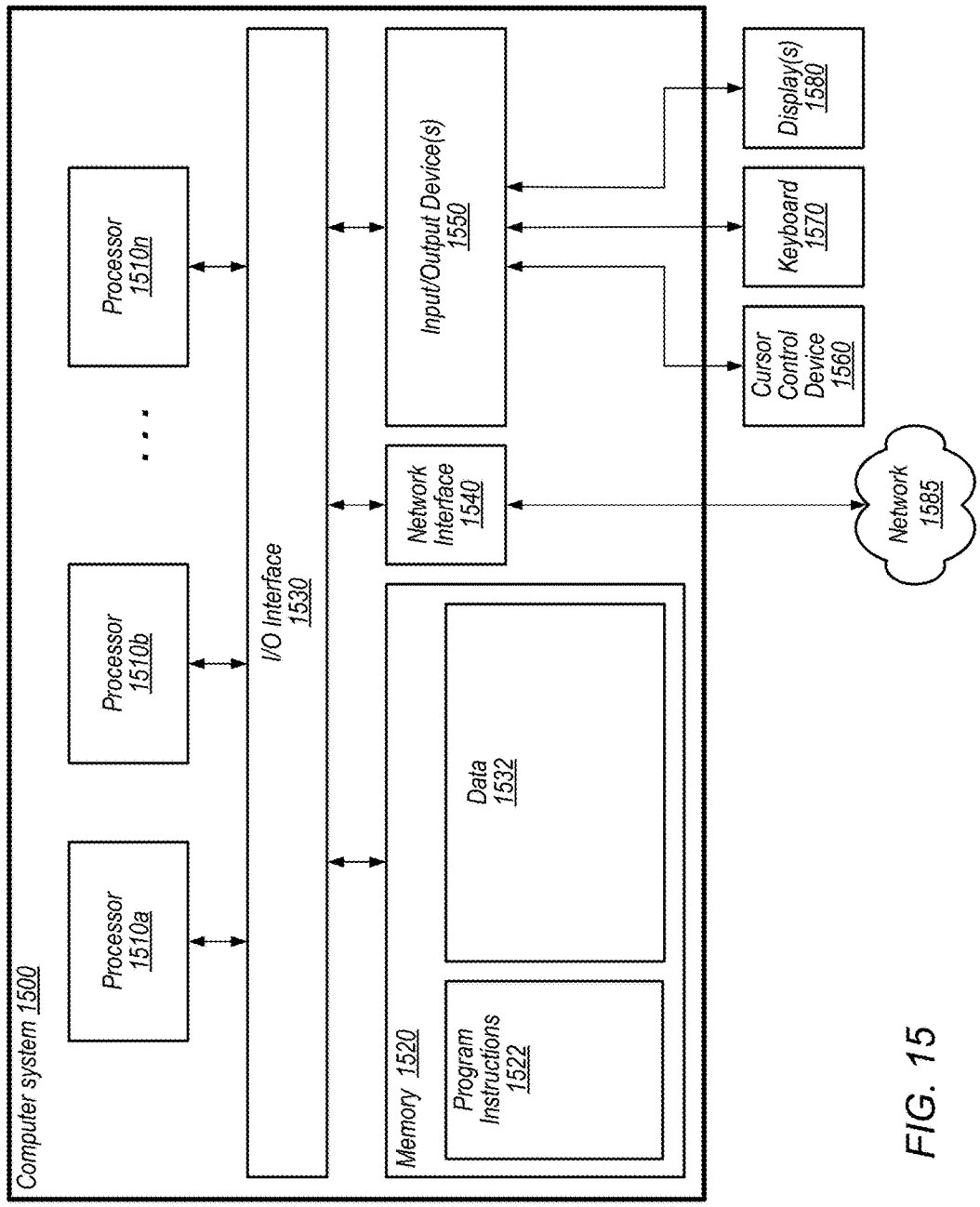
FIG. 15 illustrates an example computer system, according to some embodiments.

FIG. 15 illustrates an example computer system 1500 that may be configured to include or execute any or all of the embodiments described above. In different embodiments, computer system 1500 may be any of various types of devices, including, but not limited to, a personal computer system, desktop computer, laptop, notebook, tablet, slate, pad, or netbook computer, cell phone, smartphone, PDA, portable media device, mainframe computer system, handheld computer, workstation, network computer, a camera or video camera, a set top box, a mobile device, a consumer device, video game console, handheld video game device, application server, storage device, a television, a video recording device, a peripheral device such as a switch, modem, router, or in general any type of computing or electronic device.

Various embodiments of a light source module or a light source module controller as described herein, may be executed in one or more computer systems 1500, which may interact with various other devices. Note that any component, action, or functionality described above with respect to FIGS. 1 through 14 may be implemented on one or more computers configured as computer system 1500 of FIG. 15, according to various embodiments. In the illustrated embodiment, computer system 1500 includes one or more processors 1510 coupled to a system memory 1520 via an input/output (I/O) interface 1530. Computer system 1500 further includes a network interface 1540 coupled to I/O interface 1530, and one or more input/output devices 1550, such as cursor control device 1560, keyboard 1570, and display(s) 1580. In some cases, it is contemplated that embodiments may be implemented using a single instance of computer system 1500, while in other embodiments multiple such systems, or multiple nodes making up computer system 1500, may be configured to host different portions or instances of embodiments. For example, in one embodiment some elements may be implemented via one or more nodes of computer system 1500 that are distinct from those nodes implementing other elements.

In various embodiments, computer system 1500 may be a uniprocessor system including one processor 1510, or a multiprocessor system including several processors 1510 (e.g., two, four, eight, or another suitable number). Processors 1510 may be any suitable processor capable of executing instructions. For example, in various embodiments processors 1510 may be general-purpose or embedded processors implementing any of a variety of instruction set architectures (ISAs), such as the x8 18, PowerPC, SPARC, or MIPS ISAs, or any other suitable ISA. In multiprocessor systems, each of processors 1510 may commonly, but not necessarily, implement the same ISA.

System memory 1520 may be configured to store control program instructions 1522 and/or control data accessible by processor 1510. In various embodiments, system memory 1520 may be implemented using any suitable memory technology, such as static random access memory (SRAM), synchronous dynamic RAM (SDRAM), nonvolatile/Flash-type memory, or any other type of memory. In the illustrated embodiment, program instructions 1522 may be configured to implement a control application incorporating any of the functionality described above. Additionally, existing control data of memory 1520 may include any of the information or data structures described above. In some embodiments, program instructions and/or data may be received, sent or stored upon different types of computer-accessible media or on similar media separate from system memory 1520 or computer system 1500. While computer system 1500 is described as implementing the functionality of functional blocks of previous Figures, any of the functionality described herein may be implemented via such a computer system.

In one embodiment, I/O interface 1530 may be configured to coordinate I/O traffic between processor 1510, system memory 1520, and any peripheral devices in the device, including network interface 1540 or other peripheral interfaces, such as input/output devices 1550. In some embodiments, I/O interface 1530 may perform any necessary protocol, timing or other data transformations to convert data signals from one component (e.g., system memory 1520) into a format suitable for use by another component (e.g., processor 1510). In some embodiments, I/O interface 1530 may include support for devices attached through various types of peripheral buses, such as a variant of the Peripheral Component Interconnect (PCI) bus standard or the Universal Serial Bus (USB) standard, for example. In some embodiments, the function of I/O interface 1530 may be split into two or more separate components, such as a north bridge and a south bridge, for example. Also, in some embodiments some or all of the functionality of I/O interface 1530, such as an interface to system memory 1520, may be incorporated directly into processor 1510.

Network interface 1540 may be configured to allow data to be exchanged between computer system 1500 and other devices attached to a network 1585 (e.g., carrier or agent devices) or between nodes of computer system 1500. Network 1585 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1550 may, in some embodiments, include one or more display terminals, keyboards, keypads, touchpads, scanning devices, voice or optical recognition devices, or any other devices suitable for entering or accessing data by one or more computer systems 1500. Multiple input/output devices 1550 may be present in computer system 1500 or may be distributed on various nodes of computer system 1500. In some embodiments, similar input/output devices may be separate from computer system 1500 and may interact with one or more nodes of computer system 1500 through a wired or wireless connection, such as over network interface 1540.

As shown in FIG. 15, memory 1520 may include program instructions 1522, which may be processor-executable to implement any element or action described above. In one embodiment, the program instructions may implement the methods described above. In other embodiments, different elements and data may be included. Note that data may include any data or information described above.

Those skilled in the art will appreciate that computer system 1500 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1500 may be transmitted to computer system 1500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A mobile computing device, comprising:
   a camera;
   a light source module embedded in the mobile computing device, the light source module comprising:
      a segmented light diffusing material comprising a plurality of segments, wherein at least some of the segments have different light diffusing properties than other ones of the segments due to differences in respective surface finishes of the segments or due to fixed material differences in respective materials of the segments;
      an illumination array comprising a plurality of illumination elements, wherein separate sets of illumination elements each comprising one or more illumination elements correspond with separate ones of the segments of the segmented light diffusing material; and
      a housing configured to position the segmented light diffusing material relative to the illumination array such that light emitted from respective ones of the separate sets of illumination elements pass through corresponding respective segments of the segmented light diffusing material when the respective separate sets of the illumination elements are illuminated; and
   a controller configured to:
      detect one or more characteristics of a field of view of the camera via information received from the camera; and
      apply one or more control signals to selectively illuminate one or more sets of the separate sets of illumination elements based, at least in part, on the detected one or more characteristics of the field of view of the camera,
      wherein light emitted from a first set of illumination elements of the one or more sets passing through a corresponding first segment of the segmented light diffusing material is diffused a different amount than light emitted from another set of illumination elements of the two or more sets passing through another corresponding segment of the segmented light diffusing material.

2. The mobile computing device of claim 1, further comprising:
   an additional light diffusing material positioned in the housing configured to adjust a light diffusing property of the additional light diffusing material based on application of an electric current or voltage to the additional light diffusing material; and
   wherein to adjust a level of diffusion of the light emitted from the light source module, the controller is configured to apply the one or more control signal to adjust the electric current or voltage applied to the additional light diffusing material.

3. The mobile computing device of claim 1 wherein the segmented light diffusing material has a light diffusing property such that when the light source module is not emitting light a view of internal components of the light source module is obscured.

4. A light source module, comprising:
   a segmented light diffusing material comprising a plurality of segments, wherein at least some of the segments have different light diffusing properties than other ones of the segments due to differences in respective surface finishes of the segments or due to fixed material differences in respective materials of the segments; and
   an illumination array comprising a plurality of illumination elements, wherein separate sets of illumination elements each comprising one or more illumination elements correspond with separate ones of the segments of the segmented light diffusing material;
   wherein the light source module is configured to be embedded in a mobile computing device and is further configured to:
      receive one or more control signals for adjusting an amount of diffusion for light emitted from the light source module; and
      selectively illuminate one or more sets of the separate sets of illumination elements, in response to receiving the one or more control signals, wherein light emitted from a first set of illumination elements passing through a corresponding first segment of the segmented light diffusing material is diffused a different amount than light emitted from another set of illumination elements passing through another corresponding segment of the segmented light diffusing material.

5. The light source module of claim 4, wherein:
   at least some of the illumination elements associated with a particular segment emit a different particular color spectrum of light than other illumination elements associated with other segments of the plurality of segments.

6. The light source module of claim 4, wherein:
   at least one of the plurality of illumination elements is configured to emit light at a controllable intensity in accordance with the one or more control signals.

7. The light source module of claim 4, further comprising a plurality of reflectors, wherein individual illumination elements of the plurality of illumination elements are coupled in separate respective reflectors of the plurality of reflectors such that light emitted from a respective illumination element is directed towards a respective segment of the segmented light diffusing material associated with the respective illumination element via a respective reflector.

8. The light source module of claim 7, wherein at least one of the plurality of reflectors comprises a different shape reflector than other reflectors of the plurality of reflectors.

9. The light source module of claim 7, wherein the plurality of reflectors comprises one or more of: (a) a circular reflector, (b) a square reflector, or (c) a polygonal reflector.

10. The light source module of claim 4, further comprising one or more reflectors, wherein the plurality of illumination elements comprises a particular plurality of illumination elements associated with one or more particular segments of the plurality of segments of the segmented light diffusing material, wherein the particular plurality of illumination elements are coupled in a respective reflector of the one or more reflectors such that light emitted from the particular plurality of illumination elements is directed towards the one or more respective particular segments of the segmented light diffusing material associated with the particular plurality of illumination elements via the respective reflector.

11. The light source module of claim 10, wherein the plurality of illumination elements coupled in the respective reflector are separated from each other by a reflective partition.

12. The light source module of claim 4, further comprising an additional light diffusing material wherein:
 a light diffusing property of the additional light diffusing material is adjustable based on application of an electric current or voltage to the additional light diffusing material; and
 to adjust an amount of diffusion of the light emitted from the light source module, an electric current or voltage applied to the additional light diffusing material is adjusted.

13. The light source module of claim 4, wherein the segmented light diffusing material has a light diffusing property such that when the light source module is not emitting light a view of internal components of the light source module is obscured.

14. The light source module of claim 4 further comprising:
 a layer in addition to the segmented light diffusing material, wherein the additional layer comprises electrochromic glass or a polymer dispersed liquid crystal display, wherein the additional layer is configured to change a light transmission property of the additional layer from clear to opaque based on application of an electric current or voltage to the additional layer, wherein:
  the additional layer is positioned adjacent to the segmented light diffusing material such that the additional layer obscures a view of internal components of the light source module when the additional layer is opaque.

15. A method, performed by a mobile computing device, the method comprising:
 receiving input describing one or more characteristics of a scene;
 determining, based at least in part on the received input, one or more illumination elements of a plurality of illumination elements of a light source module embedded in the mobile computing device to illuminate, wherein different ones of the plurality of illumination elements are associated with different segments of a segmented light diffusing material, wherein at least two segments of the segmented light diffusing material have different light diffusing properties due to differences in respective surface finishes or due to fixed material differences in respective materials of the at least two segments; and
 sending one or more control signals to the light source module to selectively illuminate the one or more illumination elements, wherein light emitted from a first illumination element passing through a corresponding first segment of the segmented light diffusing material of the light source module is diffused a different amount than light emitted from another illumination element passing through another corresponding segment of the segmented light diffusing material of the light source module.

16. The method of claim 15, wherein the input describing the one or more characteristics of the scene includes one or more color characteristics of the scene the method further comprising
 determining a diffusivity adjustment for light of a particular color spectrum emitted from an illumination element of the one or more illumination elements and determining an other diffusivity adjustment for light of a different color spectrum emitted from an other illumination element of the one or more illumination elements, based at least in part on the input describing the one or more color characteristics of the scene;
 wherein the sending the one or more control signals to the light source module includes sending one or more control signals to the light source module to illuminate the scene with light of the particular color spectrum in accordance with the diffusivity adjustment and sending one or more control signals to the light source module to illuminate the scene with light of the different color spectrum in accordance with the other diffusivity adjustment.

17. The method of claim 15, further comprising:
 sending a control signal to the light source module to adjust a diffusivity adjustment of the light source module when the light source is not emitting light so that a view of internal components of the light source module is obscured when the light source module is not emitting light.

* * * * *